(12) United States Patent
Akasaka

(10) Patent No.: US 9,658,368 B2
(45) Date of Patent: May 23, 2017

(54) LENS ARRAY, METHOD FOR MANUFACTURING LENS ARRAY, ELECTRO-OPTICAL DEVICE, AND ELECTRONIC APPARATUS

(71) Applicant: Seiko Epson Corporation, Tokyo (JP)

(72) Inventor: Koichiro Akasaka, Ina (JP)

(73) Assignee: Seiko Epson Corporation, Tokyo (JP)

( * ) Notice: Subject to any disclaimer, the term of this patent is extended or adjusted under 35 U.S.C. 154(b) by 13 days.

(21) Appl. No.: 14/599,586

(22) Filed: Jan. 19, 2015

(65) Prior Publication Data

US 2015/0205013 A1 Jul. 23, 2015

(30) Foreign Application Priority Data

Jan. 23, 2014 (JP) ................................. 2014-010151

(51) Int. Cl.
*G02B 27/10* (2006.01)
*G02B 3/08* (2006.01)
*G02B 3/00* (2006.01)

(52) U.S. Cl.
CPC ......... *G02B 3/0056* (2013.01); *G02B 3/0012* (2013.01)

(58) Field of Classification Search
CPC .............................. G02B 3/005; G02B 3/0056

USPC ................ 359/619, 620, 628, 741, 796, 797
See application file for complete search history.

(56) References Cited

U.S. PATENT DOCUMENTS

| | | | |
|---|---|---|---|
| 2001/0036014 A1 | 11/2001 | Sasano et al. | |
| 2004/0027680 A1 | 2/2004 | Ozawa | |

FOREIGN PATENT DOCUMENTS

| | | |
|---|---|---|
| JP | 05-333328 A | 12/1993 |
| JP | 09-043588 A | 2/1997 |
| JP | 2000-193928 A | 7/2000 |
| JP | 2000-206310 A | 7/2000 |
| JP | 2000-314876 A | 11/2000 |
| JP | 2004-021209 A | 1/2004 |
| JP | 2004-070282 A | 3/2004 |

*Primary Examiner* — William Choi
(74) *Attorney, Agent, or Firm* — ALG Intellectual Property, LLC

(57) ABSTRACT

A microlens array is provided with a cylindrical lens and a spherical lens which are arranged in a cell, in which the cell has at least a side, a corner section, a first region, a second region, and a third region, the second region is arranged between the first region and the side, the third region is arranged between the first region and the corner section, the cylindrical lens is formed in the second region, and the spherical lens is formed in the third region. Since the light incident on a surrounding section of the microlens is concentrated by the cylindrical lens and the spherical lens, it is possible to realize the microlens array with high light utilization efficiency.

20 Claims, 11 Drawing Sheets

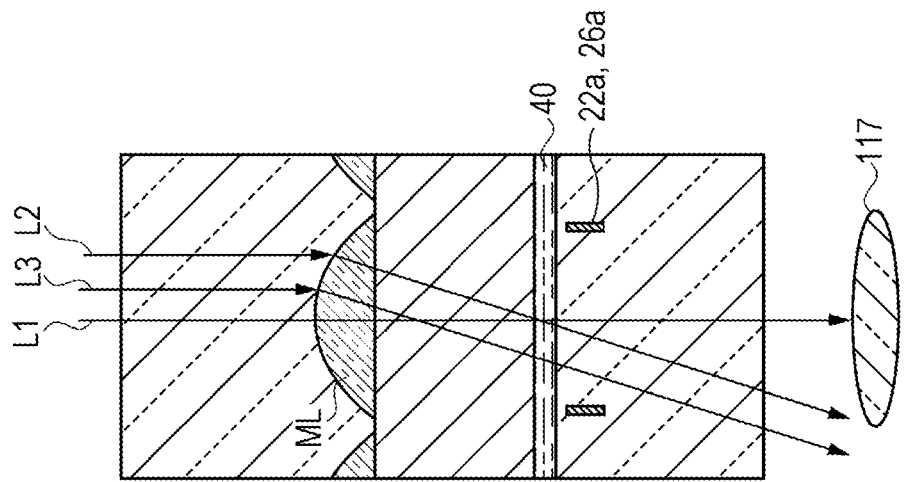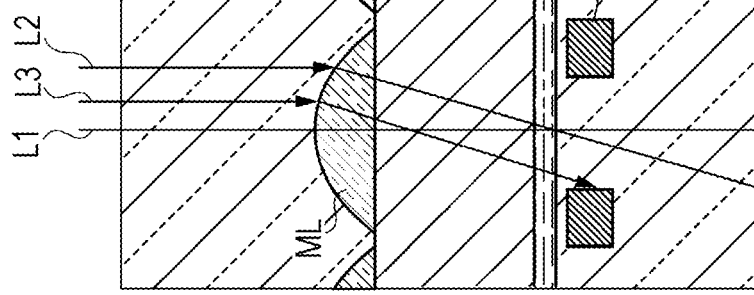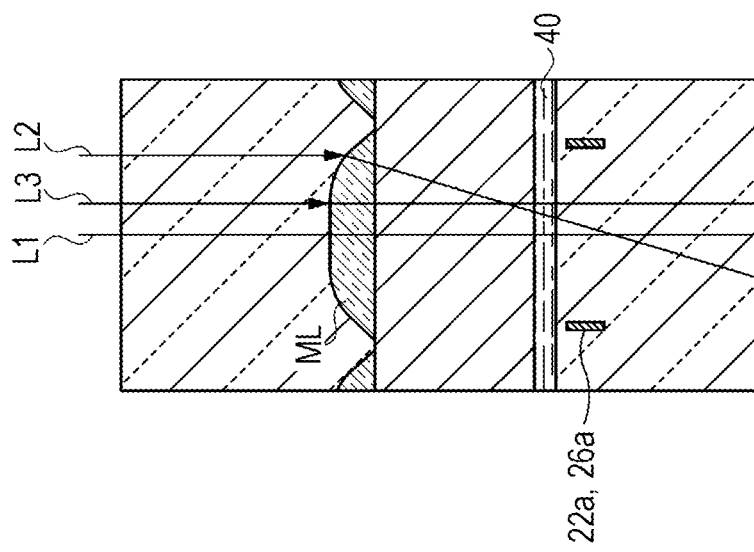

LENS ARRAY, METHOD FOR MANUFACTURING LENS ARRAY, ELECTRO-OPTICAL DEVICE, AND ELECTRONIC APPARATUS

BACKGROUND

1. Technical Field

The present invention relates to a lens array, a method for manufacturing a lens array, an electro-optical device, an electronic apparatus, and the like.

2. Related Art

Electro-optical devices which are provided with an electro-optical material such as a liquid crystal between an element substrate and a counter substrate are known. Examples of electro-optical devices include liquid crystal devices, which are used as a liquid crystal light bulb in a projector, and the like. There is a demand for realizing high light utilization efficiency in such liquid crystal devices.

A liquid crystal device is provided with TFT elements which drive pixel electrodes, wiring, and the like in pixels on an element substrate and a light shielding layer is provided so as to be planarly overlapped therewith. Due to this, a portion of incident light is shielded by the light shielding layer and not used. Therefore, as described in JP-A-2004-70282, a configuration is known which improves light utilization efficiency by concentrating incident light with microlenses by providing a microlens array in which microlenses are arranged in at least one of an element substrate and a counter substrate in a liquid crystal device.

However, there is a problem that light utilization efficiency is poor in the microlens array according to JP-A-2004-70282. A solid angle of a luminous flux which is output from the liquid crystal device may be large even when the liquid crystal device is provided with the microlens array. When a liquid crystal device which is provided with such a microlens array is used as a liquid crystal light bulb of a projector, a wide angle of light which is output from a liquid crystal device may exceed an angle of incidence regulated by an F value of a projector lens. In this case, a portion of light which is output from the liquid crystal device is not incident on the projector lens and as a result, the amount of light which is projected on a screen decreases. This problem is serious, especially in the microlens array according to JP-A-2004-70282, and even when a microlens array is used, improvement in the brightness is limited.

In other words, the microlens array of the related art has a problem in that it is difficult to sufficiently increase the light utilization efficiency.

SUMMARY

The invention can be realized in the following forms or application examples.

Application Example 1

A lens array according to this application example includes a base which has a first concave section, and a first lens which covers the first concave section, in which the first concave section includes a surface which inclines from a surface of the base.

Application Example 2

In the lens array according to Application Example 1, a first lens may include a first region, and a second region and a third region which are arranged to continue from the first region in a periphery of the first region.

In addition, the second region may include a cylindrical lens and the third region may include a spherical lens.

Application Example 3

A lens array according to this application example includes a base which has a first concave section, and a first lens which covers the first concave section, in which the first lens includes a first region, and a second region and a third region which are arranged to continue from the first region in a periphery of the first region, the second region includes a cylindrical lens, and the third region includes a spherical lens.

Application Example 4

In the lens array according to Application Example 2, light which is incident on the first region may go substantially straight, a light path of light which is incident on the second region may be bent to the first region side, and a light path of light which is incident on the third region may be bent to the first region side.

Application Example 5

In the lens array according to Application Example 1 or 2, an angle between a surface and the inclined surface may be in a range from 35° to 53°.

Application Example 6

The lens array according to any one of Application Examples 1 to 5 may further include a second lens which covers a second concave section of the base and a third lens which covers a third concave section of the base, in which the first concave section and the second concave section may be arranged to be adjacent in a first direction, the second concave section and the third concave section may be arranged to be adjacent in a second direction which intersects with the first direction, and a thickness of the base at a boundary between the first concave section and the second concave section may be thinner than a thickness of the base between the first concave section and the third concave section.

Application Example 7

In the lens array according to Application Example 6, each of the first lens, the second lens, and the third lens may respectively include a first region, and a second region and a third region which are arranged to continue from the first region in the periphery of the first region, the second region of the first lens and the second region of the second lens may be continuous, and the third region of the first lens and the third region of the third lens may be separated.

Application Example 8

In the lens array according to Application Example 7, the second region may include a cylindrical lens and the third region may include a spherical lens.

Application Example 9

A method for manufacturing a lens array according to this application example includes forming a base which has a first concave section, and forming a first lens which covers the first concave section, in which the first concave section includes a surface which inclines from a surface of the base.

Application Example 10

A method for manufacturing a lens array according to this application example includes forming a base which has a first concave section, and forming a first lens which covers the first concave section, in which the first lens includes a first region, and a second region and a third region which are arranged to continue from the first region in a periphery of the first region, the second region includes a cylindrical lens, and the third region includes a spherical lens.

Application Example 11

An electro-optical device includes the lens array according to any one of Application Examples 1 to 8.

According to this configuration, it is possible to realize an electro-optical device in which light utilization efficiency is high and a bright display is possible.

Application Example 12

An electro-optical device includes a lens array which is manufactured by the method for manufacturing a lens array according to Application Example 9 or 10.

According to this configuration, it is possible to realize an electro-optical device in which light utilization efficiency is high and a bright display is possible.

Application Example 13

An electronic apparatus includes the electro-optical device according to Application Example 11 or 12.

According to this configuration, it is possible to realize an electronic apparatus which is provided with an electro-optical device in which light utilization efficiency is high and a bright display is possible.

BRIEF DESCRIPTION OF THE DRAWINGS

The invention will be described with reference to the accompanying drawings, wherein like numbers reference like elements.

FIGS. 7A to 7C are diagrams which illustrate light utilization efficiency in an electro-optical device.

DESCRIPTION OF EXEMPLARY EMBODIMENTS

Outline

Figure 1:
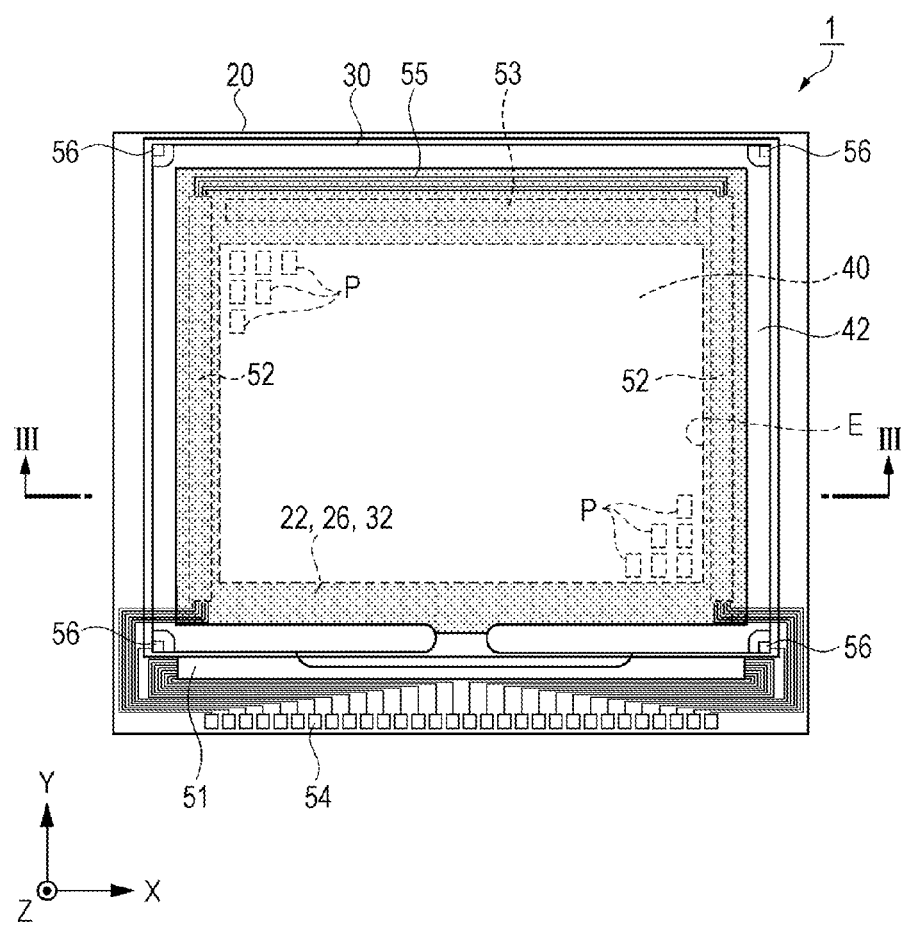
FIG. 1 is a schematic planar diagram which shows a configuration of a liquid crystal device according to Embodiment 1.

A microlens array of one aspect of the invention includes a base which has a first concave section and a first microlens which covers the first concave section, in which the first concave section includes a surface which inclines from a surface of the base.

Detailed description will be given below; however, by arranging the microlens to cover a surface which inclines from a surface of the base, it is possible to suppress variations in the angle of light which passes through the microlens and is incident on a liquid crystal and it is possible to increase the light utilization efficiency.

It is preferable that the angle between the surface and the inclined surface be in a range from 35° to 53°.

Example 1

A microlens array according to the present example is provided with a cylindrical lens and a spherical lens which are arranged in a cell, in which the cell has at least sides, a corner section, a first region, a second region, and a third region, the second region is arranged between the first region and the sides, the third region is arranged between the first region and the corner section, the cylindrical lens is formed in the second region, and the spherical lens is formed in the third region.

According to this configuration, since light which is incident on a surrounding section of the microlens is concentrated by the cylindrical lens and the spherical lens, it is possible to realize a microlens array in which the light utilization efficiency is high.

Example 2

In the microlens array according to example 1 described above, it is preferable that incident light which is incident on the first region and in parallel with a normal line of the cell be substantially straight, a light path of incident light which is incident on the second region and in parallel with a normal line of the cell be bent to the first region side by the cylindrical lens, and a light path of incident light which is incident on the third region and in parallel with a normal line of the cell be bent to the first region side by the spherical lens.

According to this configuration, since light which is incident on the central section of the microlens is straight and light which is incident on the surrounding section of the microlens is concentrated by the cylindrical lens and the spherical lens, it is possible to realize a microlens array in which the light utilization efficiency is high.

Example 3

In the microlens array according to example 1 or 2 described above, it is preferable that the sides include a first side, a second side, a third side, and a fourth side, the corner section include a first corner section, a second corner section, a third corner section, and a fourth corner section, the second region include a first second region, a second second region, a third second region, and a fourth second region, and the third region include a first third region, a second third region, a third third region, and a fourth third region.

According to this configuration, since four cylindrical lenses and four spherical lenses are arranged in the surrounding section of the microlens, it is possible to realize a microlens array in which the light utilization efficiency is high.

Example 4

A microlens array according to the present example is provided with a cylindrical lens and a spherical lens which are arranged in a cell, in which the cell has a first region, a second region, and a third region, a boundary between the first region and the second region is a straight line, a boundary between the first region and the third region is an intersection, the cylindrical lens is formed in the second region, and the spherical lens is formed in the third region.

According to this configuration, since light which is incident on a surrounding section of the microlens is concentrated by the cylindrical lens and the spherical lens, it is possible to realize a microlens array in which the light utilization efficiency is high.

Example 5

In the microlens array according to the example 4 described above, it is preferable that incident light which is incident on the first region and in parallel with a normal line of the cell be substantially straight, a light path of incident light which is incident on the second region and in parallel with a normal line of the cell be bent to the first region side by the cylindrical lens, and a light path of incident light which is incident on the third region and in parallel with a normal line of the cell be bent to the first region side by the spherical lens.

According to this configuration, since light which is incident on the central section of the microlens is straight and light which is incident on the surrounding section of the microlens is concentrated by the cylindrical lens and the spherical lens, it is possible to realize a microlens array in which the light utilization efficiency is high.

Example 6

In the microlens array according to example 4 or 5 described above, it is preferable that the second region include a first second region and a second second region, a boundary between the first region and the first second region be a first straight line, a boundary between the first region and the second second region be a second straight line, and the first straight line and the second straight line intersect at the intersection.

According to this configuration, since a plurality of cylindrical lenses and a plurality of spherical lenses are arranged in the surrounding section of the microlens, it is possible to realize a microlens array in which the light utilization efficiency is high.

A microlens of another aspect of the invention further includes a second microlens which covers a second concave section of the base and a third microlens which covers a third concave section of the base, in which the first concave section and the second concave section are arranged to be adjacent in a first direction, the second concave section and the third concave section are arranged to be adjacent in a second direction which intersects with the first direction, and a thickness of the base at a boundary between the first concave section and the second concave section is thinner than a thickness of the base between the first concave section and the third concave section.

According to this configuration, it is possible to efficiently arrange the microlens and it is possible to increase the light utilization efficiency.

A method for manufacturing a microlens array of one aspect of the invention includes forming a base which has a first concave section, and forming a first microlens which covers the first concave section, in which the first concave section includes a surface which inclines from a surface of the base.

A method for manufacturing a microlens array of another aspect of the invention includes forming a base which has a first concave section, and forming a first microlens which covers the first concave section, in which the first microlens includes a first region, and a second region and a third region which are arranged to continue from the first region in a periphery of the first region, the second region includes a cylindrical lens, and the third region includes a spherical lens.

According to these manufacturing methods, it is possible to manufacture the microlens described above.

Example 7

A method for manufacturing a microlens array according to the present example includes forming a first transparent material on a substrate, forming a mask layer which has an opening section in a unit region of the first transparent material, forming a concave section in the first transparent material by carrying out isotropic etching on the first transparent material via the mask layer, and filling the concave section with a second transparent material which has a refractive index which is different from the refractive index of the first transparent material, in which the opening section is a polygon in plan view.

According to this method, since light which is incident on a site which corresponds to the opening section of the microlens in plan view is straight, light which is incident on the outside along sides of the opening section of the microlens in plan view is concentrated by a cylindrical lens, and light which is incident on the outside of a corner of the opening section of the microlens in plan view is concentrated by a spherical lens, it is possible to realize a microlens array in which the light utilization efficiency is high.

Example 8

In the method for manufacturing a microlens array according to example 7 described above, it is preferable that at least one side which forms the unit region and at least one side which forms the opening section be substantially in parallel in plan view.

According to this method, since it is possible to make the shape of the microlens in plan view and the shape of the unit region uniform, it is possible to realize a microlens array in which the light utilization efficiency is high.

Below, description will be given of an embodiment which embodies the invention with reference to diagrams. The diagrams which are used are displayed by being appropriately enlarged, reduced, or magnified such that the portion to be illustrated is in a recognizable state. In addition, there are cases in which configuration elements other than the constituent elements which are necessary for the description are omitted from the diagrams.

Here, in the forms below, for example, a case of being described as "on a substrate" represents a case of being arranged so as to come into contact with the top of the substrate, a case of being arranged on the substrate via another component, or a case of being arranged such that a portion comes into contact with the top of the substrate and a portion is arranged via another component.

Embodiment 1

Electro-Optical Device

Here, description will be given with an active matrix type liquid crystal device which is provided with a thin film transistor (TFT) as a switching element of a pixel as an example of an electro-optical device. The liquid crystal device is able to be favorably used, for example, as an optical modulator (a liquid crystal light bulb) of a projection type display apparatus (a projector) which will be described below.

Figure 2:
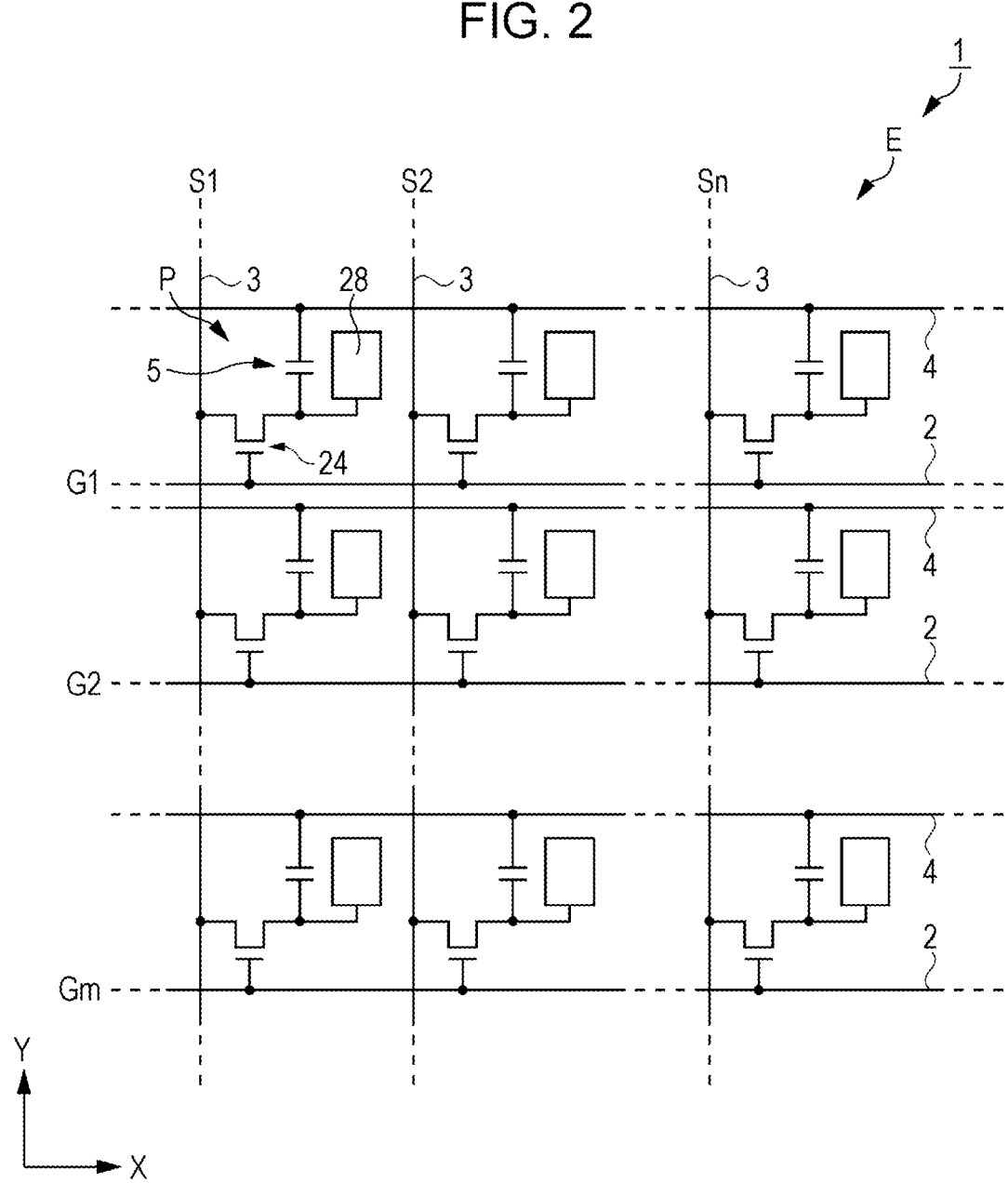
FIG. 2 is an equivalent circuit diagram which shows an electrical configuration of the liquid crystal device according to Embodiment 1.
Figure 3:
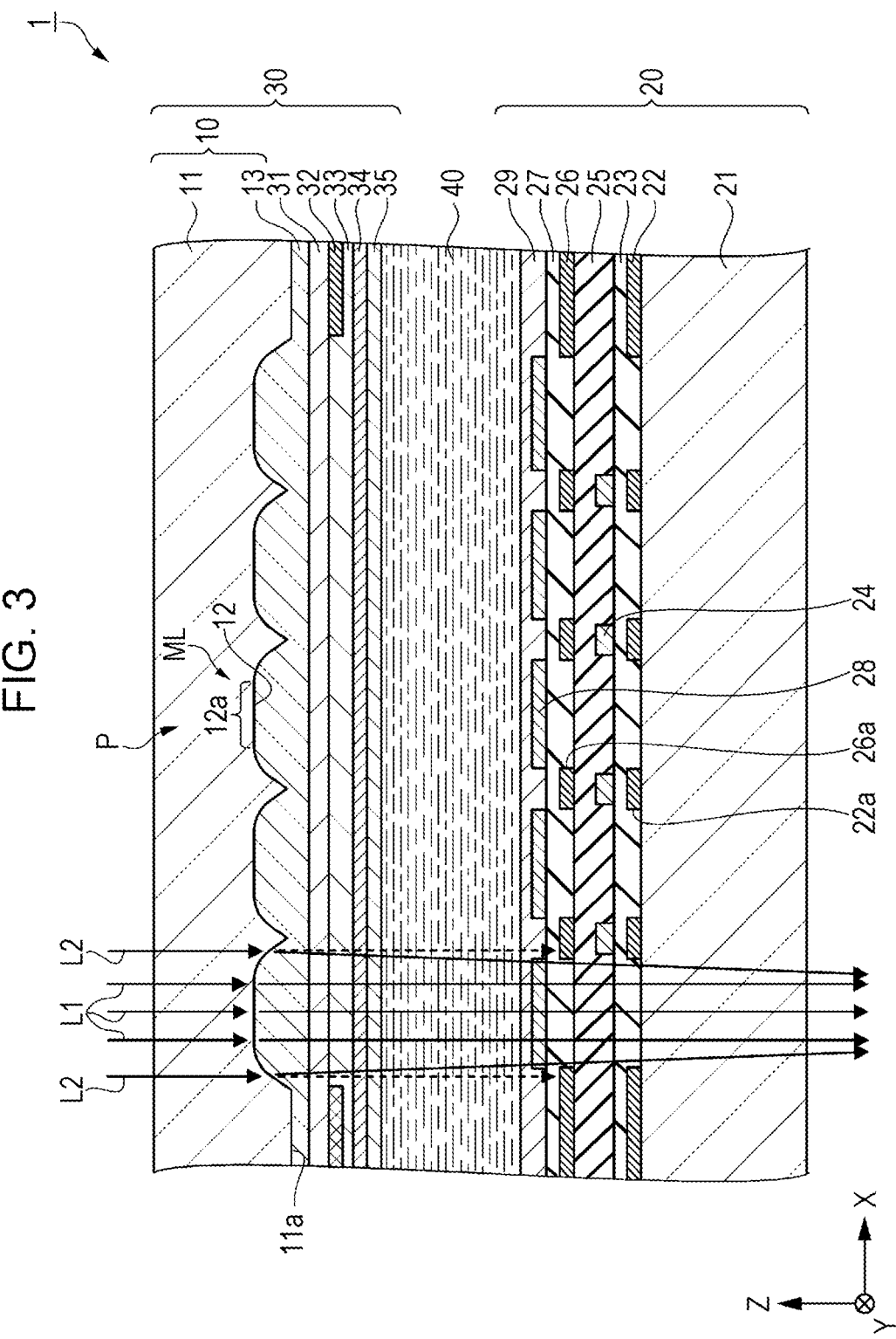
FIG. 3 is a schematic cross-sectional diagram which shows a configuration of the liquid crystal device according to Embodiment 1.

FIG. 1 is a schematic planar diagram which shows a configuration of a liquid crystal device according to Embodiment 1. FIG. 2 is an equivalent circuit diagram which shows an electrical configuration of the liquid crystal device according to Embodiment 1. FIG. 3 is a schematic cross-sectional diagram which shows a configuration of the liquid crystal device according to Embodiment 1, in detail, a partial schematic cross-sectional diagram taken along line III-III in FIG. 1. Firstly, description will be given of a liquid crystal device 1 according to Embodiment 1 with reference to FIG. 1, FIG. 2, and FIG. 3.

As shown in FIG. 1 and FIG. 3, the liquid crystal device 1 according to Embodiment 1 is provided with an element substrate 20 as a first substrate, a counter substrate 30 as a second substrate which is arranged to oppose the element substrate 20, a sealing material 42, and a liquid crystal 40 as an electro-optical material. The element substrate 20 and the counter substrate 30 are arranged to oppose each other. As shown in FIG. 1, the element substrate 20 is larger than the counter substrate 30 and both of the substrates are bonded via the sealing material 42 which is arranged in a frame shape along an edge section of the counter substrate 30.

As shown in FIG. 1, the liquid crystal 40 is held in a space which is surrounded by the element substrate 20, the counter substrate 30, and the sealing material 42 and has a positive or negative dielectric anisotropy. The sealing material 42 is, for example, formed of an adhesive agent such as a thermosetting or ultraviolet curable epoxy resin. A spacer (which is not shown in the diagram) for maintaining a constant interval between the element substrate 20 and the counter substrate 30 is mixed in the sealing material 42.

A light shielding layer 22, a light shielding layer 26, or a light shielding layer 32 as a light shielding section which has a frame shaped periphery section is provided inside the sealing material 42 which is arranged in a frame shape. The light shielding layer 22, the light shielding layer 26, or the light shielding layer 32 is, for example, formed of a light shielding metal, metal oxide, or the like. The inside of the light shielding layer 22, the light shielding layer 26, or the light shielding layer 32 is a display region E in which a plurality of pixels P are arranged. The pixels P have, for example, a substantially rectangular shape and are arranged in a matrix.

The display region E is a region which substantially contributes to the display in the liquid crystal device 1. As shown in FIG. 3, the light shielding layer 22a and the light shielding layer 26a are provided, for example, in a grid pattern in the display region E at a boundary section of each of the pixels P so as to planarly partition the pixels P. Here, the liquid crystal device 1 may be provided with a dummy region which is provided so as to surround the periphery of the display region E and which substantially does not contribute to the display.

A data line driving circuit 51 and a plurality of external connecting terminals 54 are provided along a first periphery side on the opposite side to the display region E of the sealing material 42 which is formed along the first periphery side of the element substrate 20. In addition, an inspection circuit 53 is provided on the display region E side of the sealing material 42 along another second periphery side which opposes the first periphery side. Furthermore, a scan line driving circuit 52 is provided inside the sealing material 42 along the other two periphery sides which are orthogonal with the above two periphery sides and oppose each other.

A plurality of wirings 55 which connect two scan line driving circuits 52 are provided on the display region E side of the sealing material 42 of the second periphery side where the inspection circuit 53 is provided. The wiring which is connected to the data line driving circuit 51 and the scan line driving circuit 52 is connected with a plurality of external connecting terminals 54. In addition, vertical conduction sections 56 for creating electrical conduction between the element substrate 20 and the counter substrate 30 are provided in four corners of the counter substrate 30. Here, the arrangement of the inspection circuit 53 is not limited to this configuration and the inspection circuit 53 may be provided at a position along the inside of the sealing material 42 between the data line driving circuit 51 and the display region E.

In the description below, a direction along the first periphery side where the data line driving circuit 51 is provided is set as a first direction (an X direction) and a direction which is orthogonal with the first periphery side is set as a second direction (a Y direction). The X direction is a direction which is in parallel with line III-III in FIG. 1. Black matrixes along the X direction and the Y direction are provided in a grid pattern in the element substrate 20 by the light shielding layer 22a and the light shielding layer 26a (refer to FIG. 3). Accordingly, the pixels P are partitioned in a grid pattern by the black matrixes formed of the light shielding layer 22a and the light shielding layer 26a and a region which does not overlap with the light shielding layer 22a and the light shielding layer 26a in plan view in the pixels P is an opening region (an optical modulation section) in the pixels P.

Here, a direction which is orthogonal with the X direction and the Y direction and toward the upper part in FIG. 1 is set as a Z direction. In the present specification, the view from a normal line direction (the Z direction) of the counter substrate 30 side surface of the liquid crystal device 1 is referred to as a "plan view".

As shown in FIG. 2, in the display region E, a scan line 2 and a data line 3 are formed so as to intersect with each other and the pixels P are provided in correspondence with the intersection between the scan line 2 and the data line 3. A pixel electrode 28 and a TFT 24, which is a switching element, are provided in each of the pixels P.

One of source drains of the TFT 24 is electrically connected with the data line 3 which extends from the data line driving circuit 51. Image signals S1, S2, . . . , Sn are supplied from the data line driving circuit 51 (refer to FIG. 1) to the data line 3. A gate of the TFT 24 is electrically connected with a portion of the scan line 2 which extends from the scan line driving circuit 52. Scan signals G1, G2, . . . , Gm are supplied from the scan line driving circuit 52 to the scan line 2. The other source drain of the TFT 24 is electrically connected with the pixel electrode 28.

The image signals S1, S2, . . . , Sn are written in the pixel electrode 28 via the data line 3 at a predetermined timing by setting the TFT 24 to an on state only in a set period. A storage capacitor 5 is formed between a capacitor line 4 which is formed along the scan line 2 and the pixel electrode 28 in the pixel P in order to maintain the image signals S1, S2, . . . , Sn which are supplied to the pixel electrode 28. The storage capacitor 5 is arranged to line up with a liquid crystal capacitor. Thus, when a voltage which corresponds to the image signals S1, S2, . . . , Sn is applied to the liquid crystal 40 (refer to FIG. 3) of each of the pixels P, the oriented state of the liquid crystal 40 changes due to the applied voltage, light which is incident on the liquid crystal 40 is modulated, and it is possible to display gradations.

As shown in FIG. 3, the liquid crystal device 1 has the element substrate 20 and the counter substrate 30, and the counter substrate 30 is further provided with a microlens array 10, a light path length adjusting layer 31, the light shielding layer 32, a protective layer 33, a common electrode 34, and an oriented film 35. Here, cross-sections for five pixels are drawn in FIG. 3 in order to make the description easy to understand.

The microlens array 10 is provided with a first transparent material 11 and a second transparent material 13. The first transparent material 11 and the second transparent material 13 are materials which have different refractive indexes from each other and transmit light.

The first transparent material 11 is formed of an inorganic material which has a light transmitting property such as a silicon oxide film ($SiO_X$, X is a value of 1 or 2). Since the silicon oxide film is harmless, excellent in transparency, and easily manufactured and processed, it is possible for the first transparent material to be a material which is harmless, excellent in translucency, and easily manufactured and processed. The refractive index of the silicon oxide film which forms the first transparent material 11 is in a range from 1.46 to 1.50. In the present embodiment, the first transparent material 11 is a quartz substrate and is the substrate of the counter substrate 30. When a surface on the liquid crystal 40 side of the first transparent material 11 is set as an upper surface 11a, a plurality of concave sections 12 are formed from the upper surface 11a of the first transparent material 11 and the surfaces of the concave sections 12 are a portion of the interface between the first transparent material 11 and the second transparent material 13. Each of the concave sections 12 configures a cell CL (refer to FIG. 4) of the microlens array 10 and the cells CL are provided in correspondence with the pixels P in the electro-optical device. The concave section 12 has a flat section 12a which is arranged in the central portion thereof and a curved surface section 12b and a periphery section 12c which are arranged in the periphery of the flat section 12a (refer to FIGS. 6A and 6B). Detailed description will be given below of the shape of the concave section 12.

The second transparent material 13 is formed so as to cover the first transparent material 11 and fill in the concave section 12. The second transparent material 13 is formed of a material which has a light transmitting property and a different refractive index from the first transparent material 11. In more detail, the second transparent material 13 is formed of an inorganic material which has a higher refractive index than the first transparent material 11. Examples of such an inorganic material include a silicon oxynitride film (SiON), a silicon nitride film (SiN), an alumina film ($Al_2O_3$), and the like and a preferable refractive index thereof is approximately 1.60. Since the silicon oxynitride film or the silicon nitride film are harmless, excellent in transparency, and easily manufactured and processed, it is possible for the second transparent material to be a material which is harmless, excellent in transparency, and easily manufactured and processed. In the present embodiment, the silicon oxynitride film is used as the second transparent material 13. A microlens ML with a convex shape is configured by the concave sections 12 being filled with the second transparent material 13. Detailed description will be given below of a method for manufacturing the microlens ML.

The thickness of the second transparent material 13 is formed to be thicker than the depth of the concave section 12 and the surface of the second transparent material 13 is a substantially flat surface. That is, the second transparent material 13 has a portion which configures the microlens ML by filling the concave sections 12 and a portion which fulfills a role of a planarizing layer which covers the upper surface of the first transparent material 11 and the surface of the microlens ML. The flat surface of the second transparent material 13 and the flat section 12a of the concave section 12 are substantially parallel. Here, in a case of using the wording "substantially parallel", "substantially matched", "substantially equal", or the like in the present specification, these have meanings of being in parallel in terms of the design concept, being matched in terms of the design concept, being equal in terms of the design concept, and the like and cases of being different due to errors in manufacturing, errors in measurement, minute differences, or the like are also included.

The light path length adjusting layer 31 is provided so as to cover the microlens array 10. The light path length adjusting layer 31 transmits light and is, for example, formed of an inorganic material which has substantially the same refractive index as the first transparent material 11. The light path length adjusting layer 31 is set to adjust a distance from the microlens ML to the light shielding layer 26a and such that light which is concentrated in the microlens ML passes through the opening region of the pixel P without being shielded by the light shielding layer 26a or the light shielding layer 22a. Accordingly, the thickness of the light path length adjusting layer 31 is appropriately set based on optical conditions such as a focal point distance of the microlens ML according to the wavelength of light.

The light shielding layer 32 is provided on the light path length adjusting layer 31 (the liquid crystal 40 side). The light shielding layer 32 is formed in a frame shape so as to overlap the light shielding layer 22 and the light shielding layer 26 of the element substrate 20 in plan view. The region which is surrounded by the light shielding layer 32 (the display region E) is a region in which it is possible for light to be transmitted. Here, a light shielding layer which is not shown in the diagram and using the same material as the light shielding layer 32 may be further provided on the light path length adjusting layer 31 which overlaps the light shielding layer 22a and the light shielding layer 26a in plan view. The light shielding layer which is not shown in the diagram is arranged in corners of each of the pixels P or in the periphery of each of the pixels P, reflects light, which falls on the light shielding layer 22a or the light shielding layer 26a on the element substrate 20 side without being completely concentrated in the microlens ML, on the counter substrate 30 side and has an effect that prevents increases in the temperature of the liquid crystal device 1.

The protective layer 33 is provided so as to cover the light path length adjusting layer 31 and the light shielding layer 32. The common electrode 34 is provided so as to cover the protective layer 33. The common electrode 34 is formed over a plurality of the pixels P. The common electrode 34 is, for example, formed of a transparent conductive film such as indium tin oxide (ITO) or indium zinc oxide (IZO). The oriented film 35 is provided so as to cover the common electrode 34.

Here, the protective layer 33 covers the light shielding layer 32 and planarizes the liquid crystal 40 side surface of the common electrode 34, but is not an essential constituent element. Accordingly, for example, the configuration may be a configuration in which the common electrode 34 directly covers the conductive light shielding layer 32.

The element substrate 20 is provided with a substrate 21, the light shielding layer 22, the light shielding layer 22a, an insulation layer 23, the TFT 24, an insulation layer 25, the light shielding layer 26, the light shielding layer 26a, an insulation layer 27, the pixel electrode 28, and an oriented film 29. The substrate 21 is, for example, formed of a material which transmits light such as glass, quartz, and the like or includes such a material.

The light shielding layer 22 and the light shielding layer 22a are provided on the substrate 21. The light shielding layer 22 is formed in a frame shape so as to overlap the light shielding layer 26 on the upper layer in plan view. The light shielding layer 22a and the light shielding layer 26a are arranged so as to interpose the TFT 24 therebetween in the thickness direction (the Z direction) of the element substrate 20. The light shielding layer 22a and the light shielding layer 26a overlap with at least a channel forming region of the TFT 24 in plan view. By the light shielding layer 22a and the light shielding layer 26a being provided, the incidence of light on the TFT 24 is suppressed. The region which is surrounded by the light shielding layer 22a and the light shielding layer 26a in plan view is an opening region of the pixel P and is a region in which light is transmitted in the pixel P.

The insulation layer 23 is provided so as to cover the substrate 21, the light shielding layer 22, and the light shielding layer 22a. The insulation layer 23 is, for example, formed of an inorganic material such as $SiO_2$.

The TFT 24 is provided on the insulation layer 23. The TFT 24 is a switching element which drives the pixel electrode 28. The TFT 24 includes a semiconductor layer, a gate electrode, a source electrode, and a drain electrode which are not shown in the diagram. A source, a channel forming region, and a drain are formed in the semiconductor layer. A lightly doped drain (LDD) region may be formed in the interface between the channel forming region and the source or between the channel forming region and the drain.

The gate electrode is formed in the element substrate 20 in the region which overlaps with the channel forming region of the semiconductor layer in plan view via a portion of the insulation layer 25 (a gate insulation film). Although omitted from the diagram, the gate electrode is electrically connected with a scan line which is arranged on the lower layer side via a contact hole and controls the TFT 24 to be on or off by applying a scan signal.

The insulation layer 25 is provided so as to cover the insulation layer 23 and the TFT 24. The insulation layer 25 is, for example, formed of an inorganic material such as $SiO_2$. The insulation layer 25 includes a gate insulation film which insulates between the semiconductor layer and the gate electrode of the TFT 24. Due to the insulation layer 25, surface unevenness caused by the TFT 24 is eased. The light shielding layer 26 and the light shielding layer 26a are provided on the insulation layer 25. Then, for example, the insulation layer 27 formed of an inorganic material is provided so as to cover the insulation layer 25, the light shielding layer 26, and the light shielding layer 26a.

The pixel electrode 28 is provided for each pixel P on the insulation layer 27. The pixel electrode 28 is arranged so as to overlap the opening region of the pixel P in plan view and the edge section of the pixel electrode 28 overlaps with the light shielding layer 22a or the light shielding layer 26a. The pixel electrode 28 is, for example, formed of a transparent conductive film such as ITO or IZO. The oriented film 29 is provided so as to cover the pixel electrode 28. The liquid crystal 40 is held between the oriented film 29 of the element substrate 20 and the oriented film 35 of the counter substrate 30.

Here, the TFT 24 and an electrode, a wiring, or the like (which is not shown in the diagram) which supplies an electrical signal to the TFT 24 are provided in a region which overlaps the light shielding layer 22 or the light shielding layer 22a and the light shielding layer 26 or the light shielding layer 26a in plan view. The configuration may be a configuration in which the electrode, the wiring, or the like serves as the light shielding layer 22 or the light shielding layer 22a and the light shielding layer 26 or the light shielding layer 26a.

In the liquid crystal device 1 according to Embodiment 1, for example, light which is emitted from a light source or the like is incident from the counter substrate 30 side which is provided with the microlens ML and is concentrated by the microlens ML. Out of light which is incident on the microlens ML along a normal line direction of the upper surface 11a from the first transparent material 11 side, incident light L1 which is incident on the central portion of the microlens ML in plan view (the flat section 12a of the concave section 12) goes straight through the microlens ML as is, passes through the liquid crystal 40, and is output to the element substrate 20 side.

On the other hand, incident light L2 which is incident on the surrounding section of the microlens ML in plan view (a region which overlaps with the light shielding layer 22a or the light shielding layer 26a in plan view) is shielded by the light shielding layer 26 or the light shielding layer 26a as shown with a dashed line if in a case of going straight as is. However, in the electro-optical device of the present embodiment, the incident light L2 is concentrated to the planar central side of the pixel P in the microlens ML (refraction due to the refractive index difference between the first transparent material 11 and the second transparent material 13). In the liquid crystal device 1, the light incident on the boundary between microlenses ML is also made to be incident inside the opening region of the pixel P due to a concentration effect in the boundary in this manner and is able to pass through the liquid crystal 40. As a result, the amount of light which is output from the element substrate 20 side increases and the light utilization efficiency is increased.

Microlens

Figure 4:
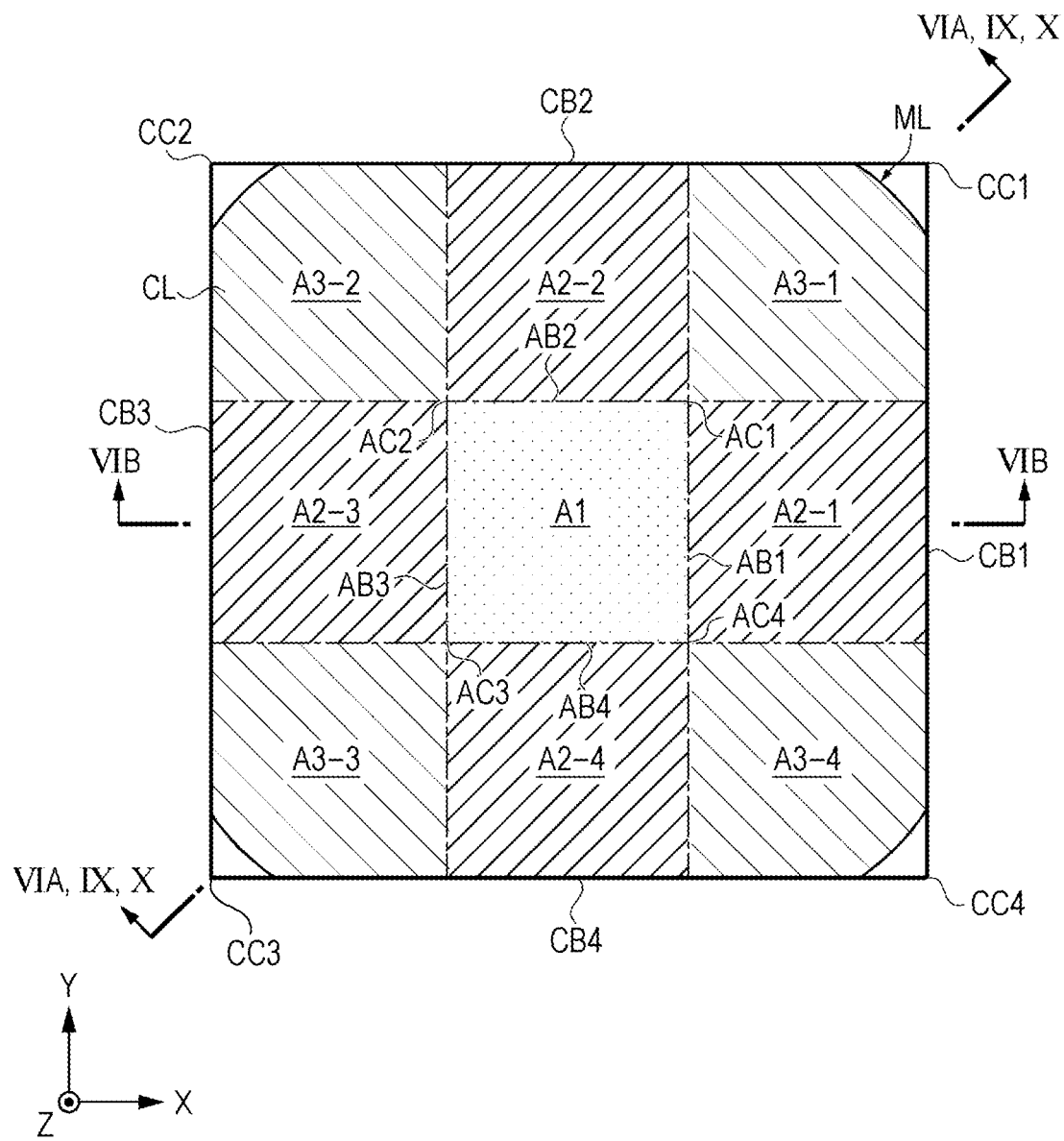
FIG. 4 is a planar diagram which illustrates a configuration of a microlens according to Embodiment 1.
Figure 5:
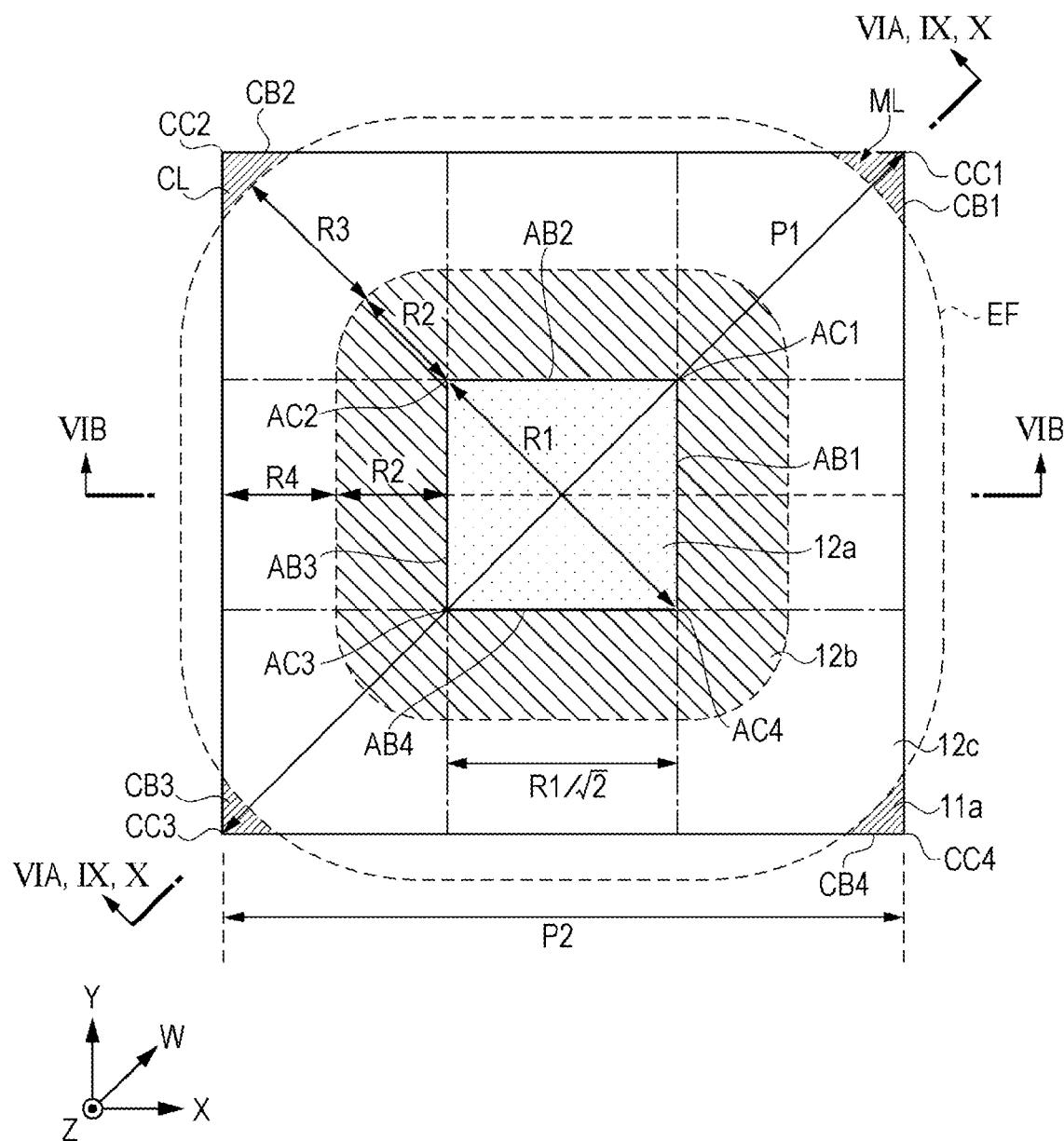
FIG. 5 is a planar diagram which illustrates the microlens according to Embodiment 1.
Figure 6A:
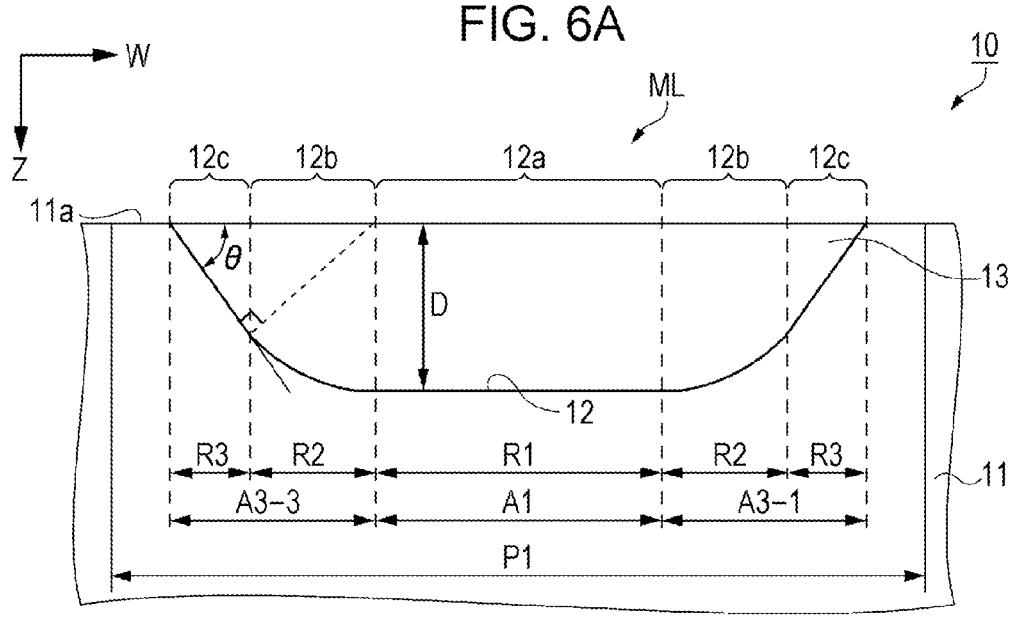
FIGS. 6A and 6B are cross-sectional diagrams which show a configuration of the microlens according to Embodiment 1.
Figure 6B:
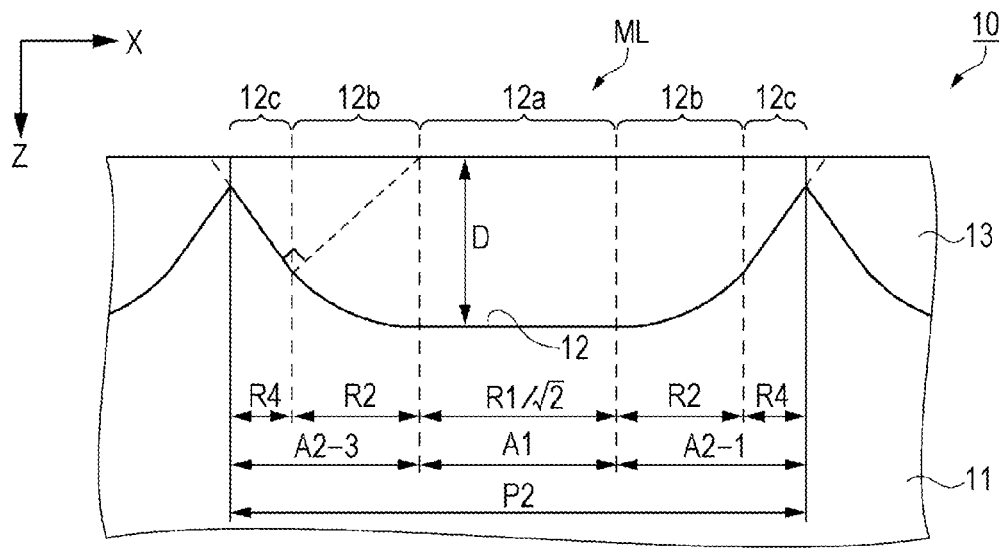

Subsequently, description will be given of a configuration and an action of the microlens ML with which the microlens array 10 according to Embodiment 1 is provided with reference to FIG. 4, FIG. 5, and FIGS. 6A and 6B. FIG. 4 is a planar diagram which illustrates a configuration of the microlens according to Embodiment 1. FIG. 5 is a planar diagram which illustrates the microlens according to Embodiment 1. FIGS. 6A and 6B are cross-sectional diagrams which show a configuration of the microlens according to Embodiment 1, FIG. 6A is a cross-sectional diagram taken along line VIA-VIA in FIG. 4 or FIG. 5, and FIG. 6B is a cross-sectional diagram taken along line VIB-VIB in FIG. 4 or FIG. 5.

The microlens array 10 is provided with a plurality of cells CL and the plurality of the cells CL are arranged in a matrix such that the cells CL which are adjacent in the X direction and the Y direction come into contact with each other. In a case in which the microlens array 10 is assembled in the electro-optical device, the cells CL of the microlens array 10 and the pixels P of the electro-optical device are aligned so as to substantially match in plan view. Here, one cell CL which configures the microlens array 10 is drawn in FIG. 4 and FIG. 5. In addition, although not shown in FIG. 4 or FIG. 5, in a case in which the microlens array 10 is assembled in the electro-optical device, the light shielding layer 22a or the light shielding layer 26a is arranged in the element substrate 20 so as to be along the boundary of the cells CL which are adjacent in the X direction and the Y direction.

As shown in FIG. 4, the cell CL has a polygonal planar shape. The cell CL is a quadrilateral and a square in the present embodiment; however, the cell CL may be a rectangle or may be a triangle or a hexagon. The planar shape of the cell CL is able to be matched with the planar shape of the pixel P.

As shown in FIG. 4, the cell CL has at least a side which is a boundary of the cell CL (a cell boundary side), a corner section where the cell boundary sides intersect (a cell corner section), a first region A1, a second region, and a third region. The first region A1 is arranged in the central portion of the cell CL and the second region and the third region are arranged outside the first region A1 and in the surrounding section of the cell CL. That is, the second region is arranged between the first region A1 and the cell boundary side and the third region is arranged between the first region A1 and the cell corner section. The boundary between the first region A1 and the second region is a straight line and the boundary between the first region A1 and the third region is an intersection.

Since the cell CL is a quadrilateral in the present embodiment, in detail, the cell boundary side includes a first cell boundary side CB1, a second cell boundary side CB2, a third cell boundary side CB3, and a fourth cell boundary side CB4, and the cell corner section includes a first cell corner section CC1, a second cell corner section CC2, a third cell corner section CC3, and a fourth cell corner section CC4. In addition, the second region includes a first second region A2-1, a second second region A2-2, a third second region A2-3, and a fourth second region A2-4, and the third region includes a first third region A3-1, a second third region A3-2, a third third region A3-3, and a fourth third region A3-4.

As an example, the first region A1 is a polygon in plan view. It is more preferable that the first region A1 be smaller than the cell CL and be a polygon which is similar to the cell CL and that at least one side which forms the cell CL and at least one side which forms the first region A1 be substantially parallel in plan view. In this manner, since it is possible to make a shape of the microlens in plan view and a shape of the cell CL uniform apart from the cell corner section, it is possible to realize the microlens array 10 in which the light utilization efficiency is high. That is, the side which is a boundary of the microlens ML matches the cell boundary side. In the present embodiment, the first region A1 is a quadrilateral and a square. In addition, the center of the cell CL in plan view (a center of gravity of the planar shape body of the cell CL) and a center of the first region A1 in plan view (a center of gravity of the planar shape body of the first region A1) are substantially matched.

A boundary between the first region A1 and the first second region A2-1 is a first straight line (a first region boundary AB1), a boundary between the first region A1 and the second second region A2-2 is a second straight line (a second region boundary AB2), a boundary between the first region A1 and the third second region A2-3 is a third straight line (a third region boundary AB3), and a boundary between the first region A1 and the fourth second region A2-4 is a fourth straight line (a fourth region boundary AB4). Each of the region boundaries intersects at an intersection. In detail, the first straight line (the first region boundary AB1) and the second straight line (the second region boundary AB2) intersect at the first intersection AC1, the second straight line (the second region boundary AB2) and the third straight line (the third region boundary AB3) intersect at the second intersection AC2, the third straight line (the third region boundary AB3) and the fourth straight line (the fourth region boundary AB4) intersect at the third intersection AC3, and the fourth straight line (the fourth region boundary AB4) and the first straight line (the first region boundary AB1) intersect at the fourth intersection AC4.

Accordingly, the first second region A2-1 is positioned between the first region boundary AB1 and the first cell boundary side CB1 in the first region A1, the second second region A2-2 is positioned between the second region boundary AB2 and the second cell boundary side CB2 in the first region A1, the third second region A2-3 is positioned between the third region boundary AB3 and the third cell boundary side CB3 in the first region A1, and the fourth second region A2-4 is positioned between the fourth region boundary AB4 and the fourth cell boundary side CB4 in the first region A1. In addition, the first third region A3-1 is positioned between the first intersection AC1 and the first cell corner section CC1 in the first region A1, the second third region A3-2 is positioned between the second intersection AC2 and the second cell corner section CC2 in the first region A1, the third third region A3-3 is positioned between the third intersection AC3 and the third cell corner section CC3 in the first region A1, and the fourth third region A3-4 is positioned between the fourth intersection AC4 and the fourth cell corner section CC4 in the first region A1.

As an example, arrangement is carried out such that a non-lens section, a cylindrical lens, and a spherical lens are included in the cell CL. In detail, the non-lens section is formed in the first region A1, the cylindrical lens is formed in the second region, and the spherical lens is formed in the third region.

The first region A1 is a flat section 12a shown in FIG. 3 and the incident light which is incident on the first region A1 and in parallel with the normal line of the cell CL is substantially straight as is.

The light path of the incident light which is incident on the second region and in parallel with the normal line of the cell CL is bent to the first region A1 side by the cylindrical lens. The cylindrical lens is a lens which converges or disperses incident light by having refractive power in one direction and which does not have refractive power in the other direction which intersects orthogonally with this direction. Accordingly, the lens surface in a lens cross-section along one direction changes to have a curvature; however, the lens surface is a straight line in a lens cross-section along the cross-section of the other direction which intersects orthogonally with this direction. In practice, in the cylindrical lenses which are arranged in the first second region A2-1 and the third second region A2-3, the lens surface (the surface of the concave section 12) changes to have a curvature along the X axis and incident light from the Z axis direction is concentrated on the first region A1 side; however, the lens surface (the surface of the concave section 12) is a straight line along the Y axis. In addition, in the cylindrical lenses which are arranged in the second second region A2-2 and the fourth second region A2-4, the lens surface (the surface of the concave section 12) changes to have a curvature along the Y axis and incident light from the Z axis direction is concentrated on the first region A1 side; however, the lens surface (the surface of the concave section 12) is a straight line along the X axis.

The light path of the incident light which is incident on the third region and in parallel with the normal line of the cell CL is bent to the first region A1 side by the spherical lens. The spherical lens which is arranged in the third region is a convex lens, the thickness of the spherical lens (the thickness of the second transparent material 13) is the maximum at the intersection of the first region A1, and the spherical lens becomes thinner further from the intersection of the first region A1. In detail, the thickness of the spherical lens (the thickness of the second transparent material 13) is the maximum at the first intersection AC1 in the spherical lens which is arranged in the first third region A3-1, the thickness of the spherical lens (the thickness of the second transparent material 13) is the maximum at the second intersection AC2 in the spherical lens which is arranged in the second third region A3-2, the thickness of the spherical lens (the thickness of the second transparent material 13) is the maximum at the third intersection AC3 in the spherical lens which is arranged in the third third region A3-3, and the thickness of the spherical lens (the thickness of the second transparent material 13) is the maximum at the fourth intersection AC4 in the spherical lens which is arranged in the fourth third region A3-4.

As shown in FIG. 5, the length of a diagonal line of the cell CL is set as P1 and the length of a side of the cell CL in the X direction is set as P2. The arrangement pitch of the cell CL in the X direction is P2. For example, when the planar shape of the cell CL is a square and the arrangement pitch P2 of the cell CL is 10 µm, the length P1 of the diagonal line of the cell CL is approximately 14 µm. A direction along the diagonal line of the cell CL is set as a W direction. The W direction is a direction which intersects with the X direction and the Y direction in a plane which is configured by the X direction and the Y direction.

As shown in FIG. 5, the concave section 12 of the microlens ML has the first region A1 (the flat section 12a) which is arranged in the central portion, the curved surface section 12b which is arranged in the periphery of the flat section 12a, and the periphery section 12c which is arranged in the periphery of the curved surface section 12b. The second region and the third region include the curved surface section 12b and the periphery section 12c. The flat section 12a, the curved surface section 12b, and the periphery section 12c are continuously formed. The first region A1 (the flat section 12a) is a rectangle and the intersections in the present embodiment are the four corners of the rectangular shape of the flat section 12a; however, the intersections may be formed in an arc shape. The curved surface section 12b and the periphery section 12c are formed in a rectangular planar shape in the second region and are concentrically formed centering on the intersection in the third region. Here, the length of the diagonal line of the first region A1 is represented by R1, the width of the curved surface section 12b is represented by R2, the maximum width of the periphery section 12c is represented by R3, and the width of the periphery section 12c in the second region is represented by R4. In the present embodiment, since the planar shape of the flat section 12a is a square, the length of the flat section 12a in the X direction and the Y direction is $R1/\sqrt{2}$. The length of the cell CL in the X direction and the Y direction is $P2=P1/\sqrt{2}$ and is in a range from approximately 4.0 µm to 30 µm. It is preferable that $R1/\sqrt{2}$ µm be in a range from 1.0 µm to less than 30 µm with respect to such a cell. Here, in the present embodiment, P1=22 µm, R1+2×(R2+R3)=20 µm, and a depth D (refer to FIGS. 6A and 6B) of the microlens ML is D=4.6 µm.

In the microlens array 10, the plurality of the concave sections 12 are arranged such that the concave sections 12 which are adjacent in the X direction and the Y direction come into contact with each other. Accordingly, the concave sections 12 which are adjacent in the X direction and the Y direction are connected with each other. On the other hand, the concave sections 12 which are adjacent in the W direction are separated from each other. The separating section is the upper surface 11a. The microlens array 10 is manufactured by isotropic etching with respect to the first transparent material 11, which has the meaning that a virtual etching surface EF at that time is larger than the cell CL apart from the vicinity of the cell corner section. The virtual etching surface EF is a length of R2+R3 from each of the region boundaries or the intersections in the first region A1. Accordingly, in the microlens ML, a relationship of R2+R4<R2+R3<(P1−R1)/2 is satisfied.

As shown in FIGS. 6A and 6B, the flat section 12a is a substantially flat surface substantially parallel with the upper surface 11a of the first transparent material 11. The flat section 12a does not have a light concentration function as a lens. Therefore, light which incident on the flat section 12a along the normal line direction of the upper surface 11a is straight as is. In the case of an electro-optical device which uses the microlens ML, since light which is incident on the flat section 12a which is positioned in the central portion of the pixel P is not shielded by the light shielding layer 26 (refer to FIG. 3) even when going straight as is, the light may not be concentrated to the center side of the pixel P.

In addition, by not concentrating the light which is incident on the flat section 12a to the planar center side of the pixel P, variations in the angle of the light which passes through the liquid crystal 40 (refer to FIG. 3) in the central portion of the pixel P are suppressed compared to the microlens ML which has the concave section 12 which is substantially spherical in the related art and which has a light concentration function over the whole region (refer to FIGS. 7B and 7C). Due to this, since the variations in the angle of the light with respect to the oriented direction of the liquid crystal molecules of the liquid crystal 40 are suppressed to be small, the contrast of the liquid crystal device 1 improves.

The curved surface section 12b is provided to continue from the flat section 12a and has a cross-section shape in the form of an arc. The curved surface section 12b has a light concentration function as a lens and light which is incident on the curved surface section 12b along the normal line direction of the upper surface 11a is concentrated to the planar center side of the cell CL. Accordingly, due to the curved surface section 12b, it is possible to make the light, which is incident outside of the central portion of the pixel P and which is shielded by the light shielding layer 26 when going straight as is in the electro-optical device, incident inside the opening region of the pixel P.

The periphery section 12c is provided to continue from the curved surface section 12b. The periphery section 12c is connected with the upper surface 11a in the W direction and connected with the periphery section 12c of the concave section 12 which is adjacent in the X direction. The periphery section 12c is an inclined surface which is inclined from the upper surface 11a toward the curved surface section 12b, a surface with a so-called tapered shape. Accordingly, since the light which is incident on the periphery section 12c along the normal line direction of the upper surface 11a is refracted to the planar center side of the cell CL, it is possible to make the light, which is shielded by the light shielding layer 26 when going straight as is in the electro-optical device, incident inside the opening region of the pixel P.

In addition, the periphery section 12c does not have a light concentration function as a lens. Accordingly, since the light which is incident on the periphery section 12c along the normal line direction of the upper surface 11a is refracted at substantially the same angle, it is possible to suppress the variations in the angle of the light which is incident on the liquid crystal 40.

Principle

FIGS. 7A to 7C are diagrams which illustrate the light utilization efficiency in an electro-optical device, FIG. 7A is a case of using the microlens according to the present embodiment, and FIGS. 7B and 7C are cases of using the microlens according to comparative examples which correspond to the techniques in the related art. Next, description will be given of the microlens ML according to the present embodiment improving the light utilization efficiency with reference to FIGS. 7A to 7C. Here, FIGS. 7B and 7C are the techniques in the related art; however, in order to facilitate understanding of the description, the same names, reference numbers, and reference numerals as the present embodiment are also used for the elements or the configuration requirements of the techniques in the related art.

As shown in FIG. 6A, when the angle between the periphery section 12c and the upper surface 11a is set as θ, it is preferable that θ be in the range from 35° to 53°, and θ=37° in the present embodiment. On the other hand, in the spherical shape microlens ML in the related art, the periphery section 12c is not present and the angle between a tangential line of the curved surface section 12b and the upper surface 11a in the end section of the microlens ML is an angle close to 90°. When the angle θ between the curved surface section 12b and the upper surface 11a is large, the light which is incident on the curved surface section 12b along the normal line direction of the upper surface 11a is greatly refracted. When the refractive angle of light is large, the refracted light is shielded by the light shielding layer 22a or the light shielding layer 26a between adjacent pixels P and the light utilization efficiency does not improve. Thus, in the related art technique shown in JP-A-2004-70282, a lens in which the central portion is spherical and the surrounding section is a circular truncated cone is used as shown in FIG. 7B or 7C.

According to diligent research by the present inventors, the reason that the light utilization efficiency is low in an electro-optical device which uses the microlens ML of the related art is described as below. That is, in a case in which a pixel size in the electro-optical device which uses the microlens array 10 as described in JPA-2004-70282 is as large as 20 µm or longer, as shown in FIG. 7C, when the microlens ML is designed such that the incident light L2 which is incident on the surrounding section of the microlens ML is incident on the projector lens 117, there are times when the incident light L3 which is incident in the vicinity of the central portion is not incident on the projector lens 117. In contrast, in a case in which the pixel size in the electro-optical device which uses the microlens array 10 as described in JP-A-2004-70282 is as small as 10 µm or shorter, as shown in FIG. 7B, when the microlens ML is designed such that the incident light L2 which is incident on the surrounding section of the microlens ML is incident on the projector lens 117, there are times when the incident light L3 which is incident in the vicinity of the central section is shielded by the light shielding layer 22a or the light shielding layer 26a. With respect to this, as shown in 7A, the light utilization efficiency is increased in the microlens array 10 according to the present embodiment since the pixel size is in a wide range from 4.0 µm to 30 µm, the incident light L1 which is incident on the central portion of the microlens ML or the incident light L3 which is incident in the vicinity of the central portion is straight, and the light which is incident on the surrounding section (the second region or the third region) of the microlens is concentrated by a plurality (four in the present embodiment) of cylindrical lenses and a plurality (four in the present embodiment) of spherical lenses.

In this manner, according to the configuration of the microlens ML with which the microlens array 10 according to Embodiment 1 is provided, compared to the microlens in the related art, the size of the pixel P has a wide range and it is possible to improve the light utilization efficiency of the liquid crystal device 1. In addition, compared to the microlens in the related art, it is possible to suppress the variations in the angle of the light which passes through the microlens ML and which is incident on the liquid crystal 40 to be small. Due to this, it is possible to obtain a brighter display and a more favorable contrast than in the related art.

Ratio of First Region in Cell

Figure 8:
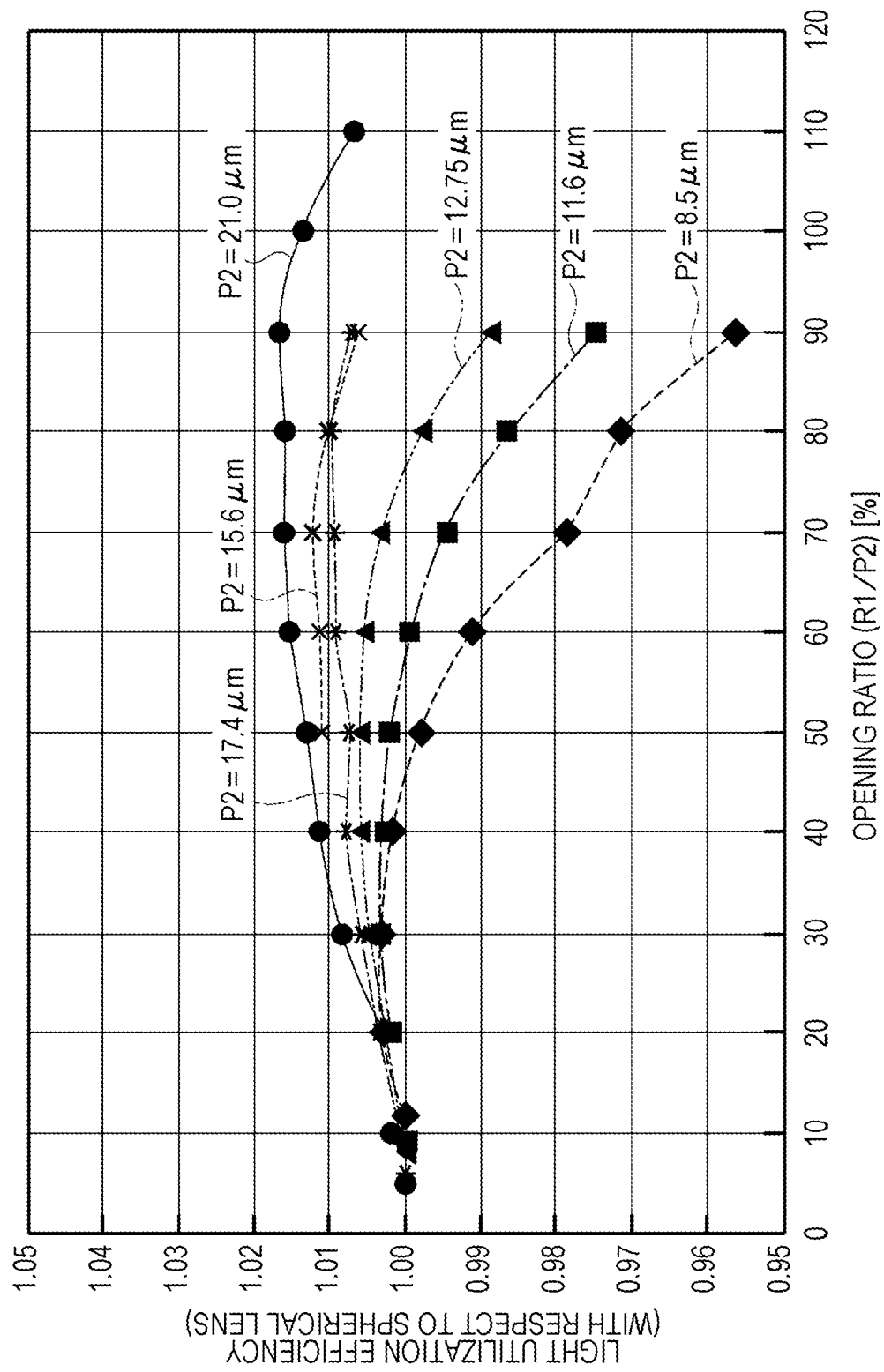
FIG. 8 is a diagram which illustrates light utilization efficiency in the microlens according to Embodiment 1.

FIG. 8 is a diagram which illustrates the light utilization efficiency in the microlens according to Embodiment 1. Next, description will be given of a relationship between the ratio of the first region A1 in the cell and the light utilization efficiency in the microlens ML according to the present embodiment with reference to FIG. 8.

FIG. 8 is a graph which compares the light utilization efficiency according to a pixel pitch (P2) by simulation when the size of the first region A1 (the flat section 12a) is differentiated in the microlens ML according to Embodiment 1 by setting the spherical microlens in the related art as a reference. The horizontal axis in FIG. 8 shows a ratio of the flat section 12a in the pixel P and in detail, a ratio of the diagonal length R1 of the first region A1 (the flat section 12a) with respect to the pixel pitch (P2). Below, the ratio is referred to as the opening ratio. The vertical axis in FIG. 8 is the light utilization efficiency and the spherical microlens (which does not have a flat section) of the related art is set to "1". Here, the "light utilization efficiency" described here indicates the brightness of an image which is displayed on a screen using the liquid crystal device 1 which is provided with the microlens ML as a liquid crystal light bulb of a projector.

In a case in which the pixel pitch is as small as 8.5 µm, the light utilization efficiency when the opening ratio is 20% to 45% improves compared to the spherical lens. This is because, even in a small pixel P, the light shielding layer 22a or the light shielding layer 26a such as the wiring width is the same as a wide pixel P and the importance of the spherical lens increases since the opening region of the pixel P is narrowed in the small pixel P. Although not shown in the diagram, in a case in which the pixel pitch is smaller than 4.0 µm, the effect of the flat section 12a is hardly seen.

In a case in which the pixel pitch is as large as 21.0 μm, the light utilization efficiency improves compared to the spherical lens when the opening ratio is 20% to 110%. This is because the importance of the spherical lens decreases since the opening region of the pixel P is wide in the big pixel P. In a case in which the pixel pitch is wider than 30 μm, the importance of the microlens is small. That is, in the microlens ML according to Embodiment 1, in a case in which the pixel pitch is large, it is possible to obtain a higher light utilization efficiency than with the spherical microlens of the related art.

Method for Manufacturing an Electro-Optical Device

Figure 9A:
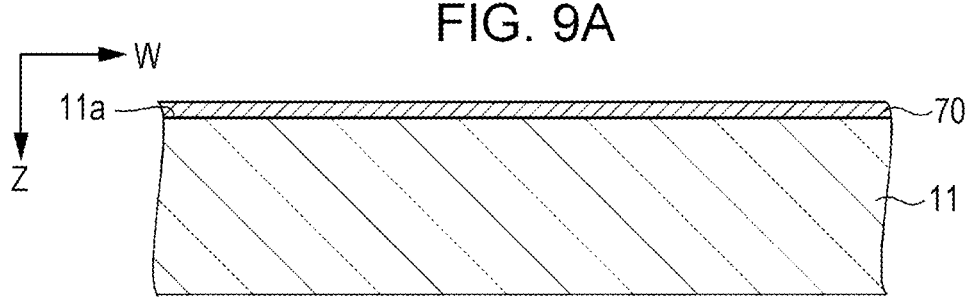
FIGS. 9A to 9D are schematic cross-sectional diagrams which show a method for manufacturing the microlens array according to Embodiment 1.

FIGS. 9A to 9D are schematic cross-sectional diagrams which show a method for manufacturing the microlens array according to Embodiment 1. FIGS. 10A to 10C are schematic cross-sectional diagrams which show a method for manufacturing the microlens array according to Embodiment 1. In detail, each diagram of FIGS. 9A to 9D and FIGS. 10A to 10C corresponds to the schematic cross-sectional diagram taken along line IXA-IXA, IXB-IXB, IXC-IXC, IXD-IXD and XA-XA, XB-XB, XC-XC in FIG. 4 and FIG. 5. Next, description will be given of a method for manufacturing the liquid crystal device 1 which has the microlens array 10 according to Embodiment 1 with reference to FIGS. 9A to 9D and FIGS. 10A to 10C. Here, in FIGS. 9A to 9D and FIGS. 10A to 10C, in order to facilitate understanding of the description, a cross-sectional diagram is drawn which corresponds to three microlenses ML when the microlens array 10 is completed. In addition, although not shown in the diagram, in the process of manufacturing the microlens array 10, processing is performed on a large substrate (a mother substrate) which is able to take a plurality of microlens arrays 10 and the plurality of the microlens arrays 10 are obtained by finally cutting and individuating the mother substrate. Accordingly, the processing is performed in a state before the mother substrate is individuated in each of the processes described below; however, here, description will be given of processing with respect to the individual microlens array 10 in the mother substrate.

Firstly, a process of forming the first transparent material 11 on a substrate is performed. In the present embodiment, since a quartz substrate serves as a portion of the first transparent material 11, this process is a process of preparing the quartz substrate and, as shown in FIG. 9A, a process of forming a control film 70 formed of a silicon oxide film or the like on the upper surface 11a of the first transparent material 11. The control film 70 has a different etching rate from the quartz substrate when forming the concave section 12 and has a function of adjusting the etching rate in the width direction (the W direction) with respect to the etching rate in the depth direction (the Z direction) when forming the concave section 12. When the etching rate of the control film 70 is fast, the angle θ is small, the curved surface section 12b is small (R2 is short), and the periphery section 12c is large (R3 is long). When the etching rate of the control film 70 is the same as the quartz substrate, since the angle θ is 90° and the periphery section 12c disappears (R3 is zero), it is necessary that the etching rate of the control film 70 be slower than the etching rate of the quartz substrate.

After forming the control film 70, annealing of the control film 70 is performed at a predetermined temperature. The etching rate of the control film 70 changes according to the temperature during the annealing. Accordingly, it is possible to adjust the etching rate of the control film 70 by appropriately setting the temperature during the annealing.

Figure 9B:
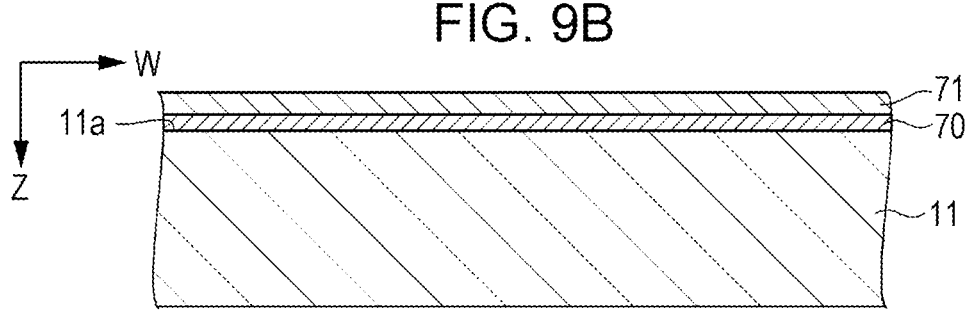
Figure 9C:
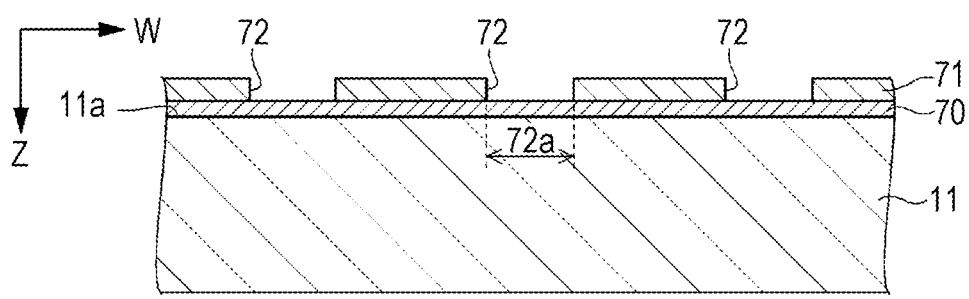
Figure 10A:
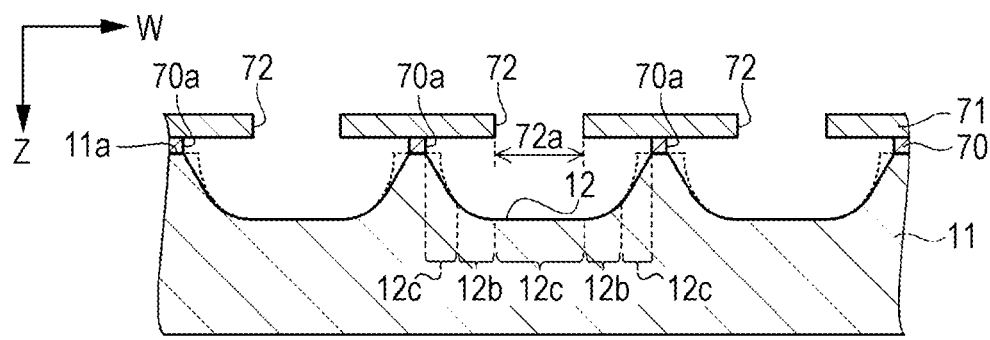
FIGS. 10A to 10C are schematic cross-sectional diagrams which show a method for manufacturing the microlens array according to Embodiment 1.
Figure 10B:
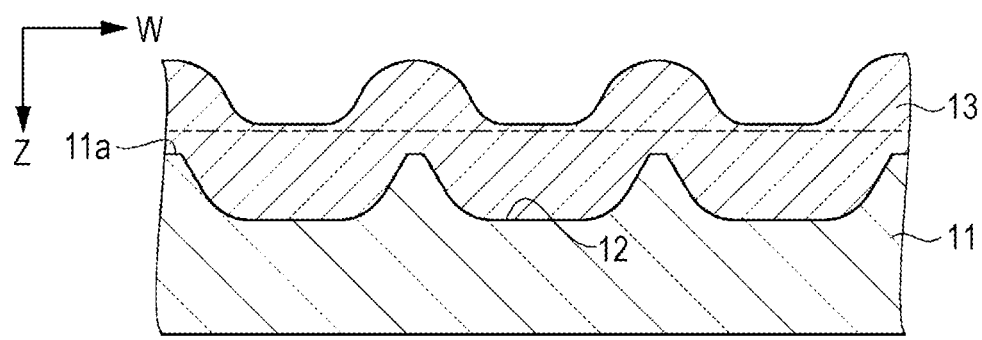
Figure 10C:
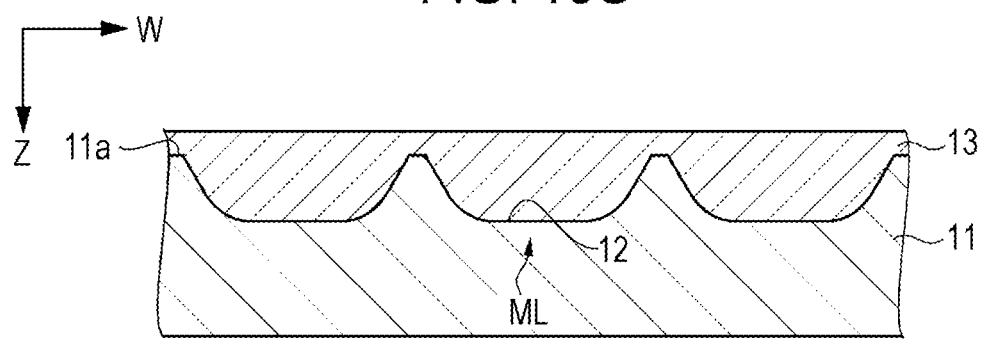

Next, as shown in FIG. 9B, a process of forming the mask layer 71 which has an opening section in the unit region on the control film 70 of the first transparent material 11 proceeds. The unit region is a region which is a cell CL when the microlens array 10 is completed. The mask layer 71 is, for example, formed of polycrystal silicon or the like on the upper surface of the first transparent material 11. The polycrystal silicon which forms a mask layer is, for example, accumulated by a chemical vapor deposition method (CVD), a physical vapor deposition method (for example, a sputtering method or the like), or the like. Subsequently, as shown in FIG. 9C, a photolithography method and a dry etching process are carried out on the accumulated thin films and the mask layer 71 which has the opening section 72 is formed. The opening section 72 is the same planar shape as the flat section 12a in plan view when the microlens array 10 is completed. Accordingly, the opening section 72 is a polygon in plan view and at least one side which forms the unit region and at least one side which forms the opening section 72 are substantially parallel in plan view.

Figure 9D:
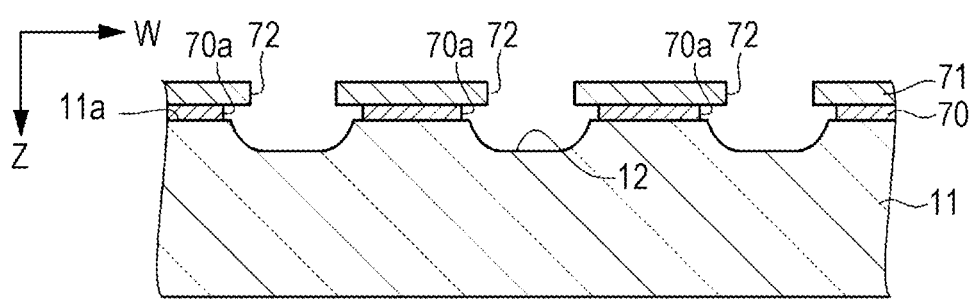

Next, as shown in FIG. 9D, by carrying out the isotropic etching on the control film 70 and the first transparent material 11 via the mask layer, a process of forming the concave section 12 on the control film 70 and the first transparent material 11 proceeds. That is, for example, an isotropic etching process such as wet etching which uses an etchant such as a hydrofluoric acid solution is carried out on the first transparent material 11 via the mask layer. A material for which the etching rate of the control film 70 is larger than the etching rate of the first transparent material 11 as described above is used for the etchant. Due to the etching process, the first transparent material 11 is isotropically etched from the upper surface side by setting the opening section as a center. As a result, the concave section 12 is formed in the control film 70 and the first transparent material 11 in correspondence with the opening section. As shown in FIG. 10A, the concave section 12 is enlarged along with the progress of the isotropic etching and a portion which corresponds to the opening section 72 of the mask layer 71 in plan view out of the concave section 12 is a substantially flat surface. Due to this, the flat section 12a is formed in the central portion of the concave section 12. In addition, the curved surface section 12b is formed so as to surround the periphery of the flat section 12a. When the control film 70 is not provided between the first transparent material 11 and the mask layer 71, the curved surface section 12b reaches the upper surface 11a of the first transparent material 11. However, in the present embodiment, the control film 70 is provided between the first transparent material 11 and the mask layer 71 and the etching amount of the control film 70 for each unit of time is more than the etching amount of the first transparent material 11 for each unit of time. Accordingly, since the enlargement amount of the opening section 70a of the control film 70 is more than the enlargement amount of the concave section 12 in the depth direction, the width direction of the concave section 12 is also enlarged along with the enlargement of the opening section 70a. Therefore, the etching amount of the first transparent material 11 in the width direction for each unit of time is more than the etching amount in the depth direction for each unit of time. Due to this, the periphery section 12c with a tapered shape is formed so as to surround the periphery of the curved surface section 12b.

As described above, it is possible to control the shape of the flat section 12a in the concave section 12 according to the shape of the opening section 72 of the mask layer 71. In addition, the respective sizes of the curved surface section 12b and the periphery section 12c in the concave section 12 are controlled according to the etching rate in the width direction of the first transparent material 11 with respect to the etching rate in the depth direction and it is possible to adjust the difference between the etching rates by setting the temperature during the annealing of the control film 70.

Next, as shown in FIG. 10B, after removing the mask layer 71 from the first transparent material 11, a process of forming the second transparent material 13 which has a higher refractive index than the first transparent material 11 so as to cover the concave section 12 proceeds. That is, a process of filling the concave section 12 with the second transparent material 13 which has a refractive index which is different from the refractive index of the first transparent material 11 proceeds. Firstly, the second transparent material 13 formed of an inorganic material which has a light transmitting property and which has a higher refractive index than the first transparent material 11 is film-formed so as to fill the concave section 12 by covering the entire region of the first transparent material 11. It is possible to form the second transparent material 13, for example, using a CVD method. Since the second transparent material 13 is formed so as to be accumulated on the upper surface of the first transparent material 11, the surface of the second transparent material 13 has an uneven shape in which unevenness caused by the concave section 12 of the first transparent material 11 is reflected. After accumulating the second transparent material 13, a planarizing process is carried out with respect to the film. In the planarizing process, for example, the upper surface of the second transparent material 13 is planarized by polishing and removing the portion of the upper layer of the second transparent material 13 in which the unevenness is formed using a chemical mechanical polishing method or the like. That is, by polishing and removing the portion above the two dotted line shown in FIG. 10B, the upper surface of the second transparent material 13 is planarized. Thus, as shown in FIG. 10C, the upper surface of the second transparent material 13 is planarized and the microlens array 10 is completed.

Next, using a technique which is known in the art, the counter substrate 30 is obtained by forming the light path length adjusting layer 31, the light shielding layer 32, the protective layer 33, the common electrode 34, and the oriented film 35 in sequence on the microlens array 10. Description will be given of the subsequent processes with reference to FIG. 3, but detailed illustration will be omitted. Meanwhile, the element substrate 20 is obtained by forming the light shielding layer 22, the insulation layer 23, the TFT 24, the insulation layer 25, the light shielding layer 26, the insulation layer 27, the pixel electrode 28, and the oriented film 29 in sequence on the substrate 21.

Next, as the sealing material 42 (refer to FIG. 1), a thermosetting or photocurable adhesive agent is arranged and cured between the element substrate 20 and the counter substrate 30. Due to this, the element substrate 20 and the counter substrate 30 are bonded and the liquid crystal device 1 is completed.

Electronic Apparatus

Figure 11:
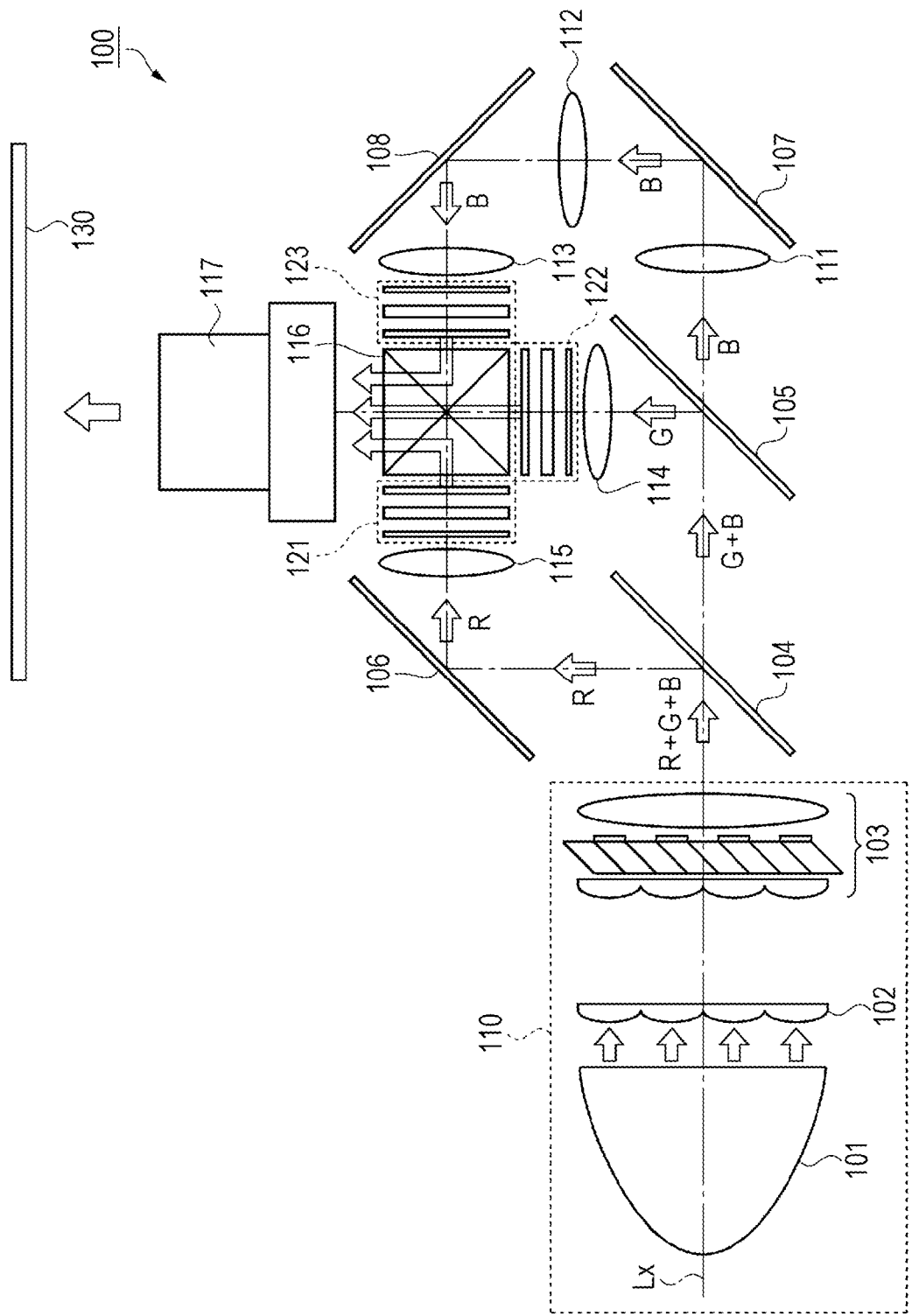
FIG. 11 is a schematic diagram which shows a configuration of a projector as an electronic apparatus according to Embodiment 1.

Next, description will be given of an electronic apparatus with reference to FIG. 11. FIG. 11 is a schematic diagram which shows a configuration of a projector as an electronic apparatus according to Embodiment 1.

As shown in FIG. 11, the projector (the projection type display apparatus) 100 as the electronic apparatus according to Embodiment 1 is provided with a polarization lighting apparatus 110, two dichroic mirrors 104 and 105, three reflection mirrors 106, 107, and 108, five relay lenses 111, 112, 113, 114, and 115, three liquid crystal light bulbs 121, 122, and 123, a cross dichroic prism 116, and the projector lens 117.

The polarization lighting apparatus 110 is, for example, provided with a lamp unit 101 as a light source formed of a white light source such as an ultrahigh pressure mercury lamp or a halogen lamp, an integrator lens 102, and a polarization conversion element 103. The lamp unit 101, the integrator lens 102, and the polarization conversion element 103 are arranged along a system optical axis Lx.

The dichroic mirror 104 reflects a red light (R) out of the polarization luminous flux which is output from the polarization lighting apparatus 110 and transmits a green light (G) and a blue light (B). The other dichroic mirror 105 reflects the green light (G) which is transmitted through the dichroic mirror 104 and transmits the blue light (B).

The red light (R) which is reflected by the dichroic mirror 104 is incident on the liquid crystal light bulb 121 via the relay lens 115 after being reflected by the reflection mirror 106. The green light (G) which is reflected by the dichroic mirror 105 is incident on the liquid crystal light bulb 122 via the relay lens 114. The blue light (B) which is transmitted through the dichroic mirror 105 is incident on the liquid crystal light bulb 123 via an optical guiding system which is configured by the three relay lenses 111, 112, and 113 and the two reflection mirrors 107 and 108.

The transmission type liquid crystal light bulbs 121, 122, and 123 as optical modulators are respectively arranged to oppose the incident surface for each colored light of the cross dichroic prism 116. The colored light which is incident on the liquid crystal light bulbs 121, 122, and 123 is modulated based on video information (a video signal) and is output toward the cross dichroic prism 116.

The cross dichroic prism 116 is configured by bonding four rectangular prisms and a dielectric multilayer film which reflects the red light and a dielectric multilayer film which reflects the blue light are formed in a cross shape on the inner surface thereof. Light which represents a color image is synthesized by the three colored lights being synthesized by the dielectric multilayer films. The synthesized light is projected on a screen 130 by the projector lens 117 which is a projection optical system and the image is enlarged and displayed.

The liquid crystal device 1 described above is applied to the liquid crystal light bulb 121. The liquid crystal light bulb 121 is arranged by placing an interval between a pair of polarization elements which are arranged in a crossed nicol state on the incident side and the output side of the colored light. The other liquid crystal light bulbs 122 and 123 are the same.

According to the configuration of the projector 100 according to Embodiment 1, it is possible to provide the projector 100 which is bright and of high quality even when a plurality of the pixels P are arranged with high definition since the liquid crystal device 1 which has the microlens ML which is able to efficiently use the incident colored light is provided.

The invention is not limited to the embodiments described above and it is possible to add various types of changes or improvements to the embodiments described above within a range which does not depart from the gist of the invention. For example, the invention is able to be applied even to a form with a configuration in which the flat section 12a of the first region A1 has a curvature.

The entire disclosure of Japanese Patent Application No. 2014-010151, filed Jan. 23, 2014 is expressly incorporated by reference herein.

What is claimed is:

1. A lens array comprising:
a base which has a first concave section, a second concave section, and a third concave section;
a first lens which covers the first concave section;
a second lens which covers the second concave section; and
a third lens which covers the third concave section, wherein
each of the first concave section, the second concave section, and the third concave section includes a flat section substantially parallel to a surface of the base, and a surface which inclines from the surface of the base,
the first concave section and the second concave section are arranged to be adjacent in a first direction,
the second concave section and the third concave section are arranged to be adjacent in a second direction which intersects with the first direction, and
a thickness of the base at a boundary between the first concave section and the second concave section is thinner than a thickness of the base at a boundary between the first concave section and the third concave section.

2. The lens array according to claim 1,
wherein the first lens includes a first region, and a second region and a third region which are arranged to continue from the first region in a periphery of the first region,
the second region includes a cylindrical lens, and
the third region includes a spherical lens.

3. The lens array according to claim 2,
wherein light which is incident on the first region goes substantially straight,
a light path of the light which is incident on the second region is bent to the first region side, and
a light path of the light which is incident on the third region is bent to the first region side.

4. An electro-optical device comprising:
the lens array according to claim 3.

5. An electro-optical device comprising:
the lens array according to claim 2.

6. The lens array according to claim 1,
wherein an angle between the surface and the inclined surface is in the range from 35° to 53°.

7. An electro-optical device comprising:
the lens array according to claim 6.

8. The lens array according to claim 1,
wherein each of the first lens, the second lens, and the third lens respectively includes a first region, and a second region and a third region which are arranged to continue from the first region in the periphery of the first region,
the second region of the first lens and the second region of the second lens are continuous, and
the third region of the first lens and the third region of the third lens are separated.

9. The lens array according to claim 8,
wherein the second region includes a cylindrical lens, and
the third region includes a spherical lens.

10. An electro-optical device comprising:
the lens array according to claim 9.

11. An electro-optical device comprising:
the lens array according to claim 8.

12. An electro-optical device comprising:
the lens array according to claim 1.

13. An electronic apparatus comprising:
the electro-optical device according to claim 12.

14. The lens array according to claim 1, wherein each of the first concave section, the second concave section, and the third concave section further includes:
a curved surface section arranged to continue from the flat section, and
a periphery section arranged to continue from the curved surface section and including a surface which inclines from the surface of the base.

15. A lens array comprising:
a base which has a first concave section; and
a first lens which covers the first concave section,
wherein the first lens includes a first region, and a second region and a third region which are arranged to continue from the first region in a periphery of the first region,
the first region includes a flat section,
the second region includes a cylindrical lens, and
the third region includes a spherical lens.

16. An electro-optical device comprising:
the lens array according to claim 15.

17. A method for manufacturing a lens array, comprising:
forming a base which has a first concave section, a second concave section, and a third concave section; and
forming a first lens which covers the first concave section, a second lens which covers the second concave section, and a third lens which covers the third concave section, wherein
each of the first concave section, the second concave section, and the third concave section includes a flat section substantially parallel to a surface of the base, and a surface which inclines from the surface of the base,
the first concave section and the second concave section are arranged to be adjacent in a first direction,
the second concave section and the third concave section are arranged to be adjacent in a second direction which intersects with the first direction, and
a thickness of the base at a boundary between the first concave section and the second concave section is thinner than a thickness of the base at a boundary between the first concave section and the third concave section.

18. An electro-optical device comprising:
a lens array which is manufactured by the method for manufacturing a lens array according to claim 17.

19. A method for manufacturing a lens array, comprising:
forming a base which has a first concave section; and
forming a first lens which covers the first concave section, wherein the first lens includes a first region, and a second region and a third region which are arranged to continue from the first region in a periphery of the first region,
the first region includes a flat section,
the second region includes a cylindrical lens, and
the third region includes a spherical lens.

20. A lens array comprising:
a base which has a first concave section; and
a first lens which covers the first concave section, wherein
the first concave section includes a flat section substantially parallel to a surface of the base, and a surface which inclines from the surface of the base,
the first lens includes a first region, and a second region and a third region which are arranged to continue from the first region in a periphery of the first region,
the first region includes the flat section, the second region includes a cylindrical lens, and
the third region includes a spherical lens.

* * * * *